(12) United States Patent
Hirata et al.

(10) Patent No.: US 11,079,633 B2
(45) Date of Patent: Aug. 3, 2021

(54) LIQUID CRYSTAL DISPLAY APPARATUS

(71) Applicants: SAKAI DISPLAY PRODUCTS CORPORATION, Sakai (JP); SHARP KABUSHIKI KAISHA, Sakai (JP)

(72) Inventors: Mitsuaki Hirata, Sakai (JP); Fumikazu Shimoshikiryoh, Sakai (JP)

(73) Assignees: SAKAI DISPLAY PRODUCTS CORPORATION, Sakai (JP); SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/885,944

(22) Filed: May 28, 2020

(65) Prior Publication Data

US 2020/0379303 A1    Dec. 3, 2020

Related U.S. Application Data

(60) Provisional application No. 62/853,982, filed on May 29, 2019.

(51) Int. Cl.
  *G02F 1/1337*    (2006.01)
  *G02F 1/1343*    (2006.01)

(52) U.S. Cl.
  CPC ...... *G02F 1/133753* (2013.01); *G02F 1/1337* (2013.01); *G02F 1/133707* (2013.01); *G02F 1/133757* (2021.01); *G02F 1/133788* (2013.01); *G02F 1/133742* (2021.01);
  (Continued)

(58) Field of Classification Search
  CPC ... G02F 1/134345; G02F 2001/134345; G02F 2201/123; G02F 1/134309; G02F 1/133753; G02F 1/133761; G02F 1/133757; G02F 2001/133757; G02F 1/133742; G02F 1/133707
  See application file for complete search history.

(56) References Cited

U.S. PATENT DOCUMENTS

| | | |
|---|---|---|
| 2003/0227429 A1 | 12/2003 | Shimoshikiryo |
| 2004/0001167 A1 | 1/2004 | Takeuchi et al. |
| 2009/0284703 A1 | 11/2009 | Shoraku et al. |

(Continued)

FOREIGN PATENT DOCUMENTS

| | | |
|---|---|---|
| JP | 2004-062146 A | 2/2004 |
| JP | 2004-078157 A | 3/2004 |

(Continued)

*Primary Examiner* — Jia X Pan
(74) *Attorney, Agent, or Firm* — ScienBiziP, P.C.

(57) ABSTRACT

A liquid crystal display apparatus includes first and second substrates and a liquid crystal layer of vertical alignment type. The first substrate includes pixel electrodes and a first alignment film, whereas the second substrate includes a counter electrode and a second alignment film. Each pixel includes first and second subpixels which allow respectively different voltages to be applied across the liquid crystal layer. Each pixel electrode includes first and second subpixel electrodes. Each of the first and second subpixels includes first to fourth liquid crystal domains having respectively different reference alignment directions being defined by the first and second alignment films. First to fourth directions, which are the reference alignment directions of the first to fourth liquid crystal domains, each make an angle which is substantially equal to an odd multiple of 45° with respect to the pixel transverse direction.

5 Claims, 18 Drawing Sheets

(52) U.S. Cl.
CPC .. *G02F 1/133761* (2021.01); *G02F 1/134345* (2021.01); *G02F 2201/123* (2013.01)

(56) References Cited

U.S. PATENT DOCUMENTS

| | | | |
|---|---|---|---|
| 2015/0036073 A1* | 2/2015 | Im | G02F 1/136209 |
| | | | 349/48 |
| 2016/0274409 A1* | 9/2016 | Kang | G02F 1/133512 |
| 2017/0192315 A1* | 7/2017 | Kim | G02F 1/133707 |
| 2018/0284544 A1 | 10/2018 | Shimoshikiryoh et al. | |

FOREIGN PATENT DOCUMENTS

| | | |
|---|---|---|
| WO | 2006/132369 A1 | 12/2006 |
| WO | 2017/057210 A1 | 4/2017 |

* cited by examiner

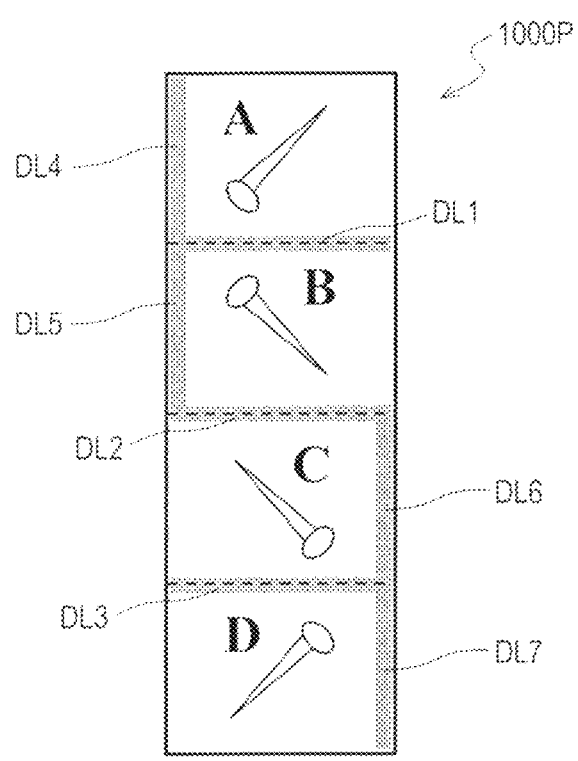

COMPARATIVE EXAMPLE 1

COMPARATIVE EXAMPLE 2

| COMPARATIVE EXAMPLE 3 | COMPARATIVE EXAMPLE 5 | EXAMPLE 1 |

COMPARATIVE EXAMPLE 4    COMPARATIVE EXAMPLE 6    EXAMPLE 2

LIQUID CRYSTAL DISPLAY APPARATUS

BACKGROUND

1. Technical Field

The present invention relates to liquid crystal display apparatuses, and more particularly to a liquid crystal display apparatus including a liquid crystal layer of vertical-alignment type, such that pretilt directions of liquid crystal molecules are defined by alignment films.

2. Description of the Related Art

A technique for improving the viewing angle characteristics of a liquid crystal display apparatus of VA (Vertical Alignment) mode is based on an alignment division structure in which a plurality of liquid crystal domains are created within a single pixel. As an approach to forming the alignment division structure, a 4D-RTN (Reverse Twisted Nematic) mode has been proposed in the recent years.

Under the 4D-RTN mode, pretilt directions of liquid crystal molecules are defined by alignment films, whereby an alignment division structure is formed. A liquid crystal display apparatus of 4D-RTN mode is disclosed in Patent Document 1, for example. In the liquid crystal display apparatus disclosed in Patent Document 1, a four-split alignment structure is formed by using alignment films to define pretilt directions. That is, when a voltage is applied across the liquid crystal layer, four liquid crystal domains are created within one pixel. A four-split alignment structure as such may simply be referred to as a 4D structure.

Moreover, in the liquid crystal display apparatus of Patent Document 1, regarding a pair of alignment films opposing each other via a liquid crystal layer interposed therebetween, there is a difference of substantially 90° between the pretilt direction that is defined by one alignment film and the pretilt direction defined by the other alignment film. Therefore, under an applied voltage, the liquid crystal molecules take a twist alignment. As will be understood from the disclosure of Patent Document 1, under the 4D-RTN mode, typically, the four liquid crystal domains are disposed in two rows and two columns within the pixel.

Patent Document 2 also discloses a VA mode liquid crystal display apparatus in which an alignment division structure is formed by using alignment films to define pretilt directions. In the liquid crystal display apparatus disclosed in Patent Document 2, the pretilt direction that is defined by one of a pair of alignment films and the pretilt direction that is defined by the other alignment film are antiparallel. Therefore, under an applied voltage, liquid crystal molecules do not take a twist alignment. In the liquid crystal display apparatus of Patent Document 2, the four liquid crystal domains within the pixel are arranged in four rows and one column.

The aforementioned improvements in the VA mode (i.e., alignment division structures based on alignment films) can provide high viewing angle characteristics. On the other hand, in recent years, a "pixel division driving technique" has been put to practical use (for example, Patent Documents 3 and 4) as a technique for improving the viewing angle characteristics of a VA mode liquid crystal display apparatus.

The pixel division driving technique improves the problematic difference between the γ (gamma) characteristics observed in the frontal direction and the γ characteristics observed in an oblique direction, i.e., viewing angle dependence of γ characteristics. Note that γ characteristics refer to gray scale dependence of display luminance.

In the pixel division driving technique, one pixel consists of a plurality of subpixels in which respectively different voltages can be applied across the liquid crystal layer, i.e., a plurality of subpixels which can present respectively different luminances. Thus, for a given display signal voltage that is input to the pixel, a predetermined luminance is achieved by the entirety of one pixel. In other words, the pixel division driving technique is a technique which improves the viewing angle dependence of γ characteristics within the pixel by combining respectively differing γ characteristics of the plurality of subpixels.

When the alignment division structures disclosed in Patent Documents 1 and 2 are combined with the pixel division driving technique as is disclosed in Patent Documents 3 and 4, from the standpoint of providing further improvements on the viewing angle characteristics, it is preferable for each of the plurality of subpixels to include four liquid crystal domains. For example, when a pixel is split into two subpixels, it is preferable for each of the two subpixels to include four liquid crystal domains, such that one pixel includes eight liquid crystal domains.

Patent Document 1: International Publication No. 2006/132369

Patent Document 2: International Publication No. 2017/057210

Patent Document 3: Japanese Laid-Open Patent Publication No. 2004-62146

Patent Document 4: Japanese Laid-Open Patent Publication No. 2004-78157

SUMMARY

In a 4D-RTN mode liquid crystal display apparatus, as is described in Patent Document 1, dark lines (regions that are darker than other regions) will occur in the pixel under an applied voltage. The dark lines cause a decrease in transmittance (i.e., a decrease in the efficiency of light utilization). The region in which dark lines occur may take a different overall shape depending on the pattern of alignment division, but, irrespective of the pattern being adopted, it always includes a cross-shaped portion corresponding to boundaries between liquid crystal domains.

As will be described in detail later, the inventors have paid attention to the following fact: when the pixel has a large aspect ratio (e.g. when the value of lateral length:vertical length is about 1:3), the total area of dark lines can be reduced (and thus providing an improved transmittance) by adopting a domain arrangement such as is disclosed in Patent Document 2 (i.e., an arrangement where four liquid crystal domains are arranged in four rows and one column within the pixel, which may hereinafter be referred to as a "single column arrangement"), as compared to adopting a two-rows by two-columns arrangement. However, it has been found through further studies that, a mere combination of the aforementioned single column arrangement and the pixel division driving technique will hardly improve transmittance, or may conversely deteriorate transmittance. The reasons thereof will also be described in detail later.

The present invention has been made in view of the above problems, and an objective thereof is to improve transmittance of a VA mode liquid crystal display apparatus in which an alignment division structure is formed by using alignment films to define pretilt directions and in which the pixel division driving technique is applied.

The present specification discloses liquid crystal display apparatuses as recited in the following Items.

[Item 1]

A liquid crystal display apparatus comprising:

a first substrate and a second substrate opposing each other; and a liquid crystal layer of vertical alignment type provided between the first substrate and the second substrate, the liquid crystal display apparatus having a plurality of pixels, wherein, the first substrate includes a pixel electrode provided for each of the plurality of pixels, and a first alignment film provided between the pixel electrodes and the liquid crystal layer;

the second substrate includes a counter electrode opposing the pixel electrode, and a second alignment film provided between the counter electrode and the liquid crystal layer;

each of the plurality of pixels includes a first subpixel and a second subpixel which allow respectively different voltages to be applied across the liquid crystal layer;

the pixel electrode of each pixel includes a first subpixel electrode provided for the first subpixel and a second subpixel electrode provided for the second subpixel;

each of the first subpixel and the second subpixel includes a first liquid crystal domain, a second liquid crystal domain, a third liquid crystal domain, and a fourth liquid crystal domain, each liquid crystal domain having a reference alignment direction defined by the first alignment film and the second alignment film, and the first to fourth liquid crystal domains having respectively different reference alignment directions;

a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction;

the first direction, the second direction, the third direction, and the fourth direction each make an angle which is substantially equal to an odd multiple of 45° with respect to the pixel transverse direction of each pixel;

in each pixel, each of the first subpixel electrode and the second subpixel electrode includes; a first slit which is formed in a region corresponding to the first liquid crystal domain and which extends substantially in parallel to the first direction; a second slit which is formed in a region corresponding to the second liquid crystal domain and which extends substantially in parallel to the second direction; a third slit which is formed in a region corresponding to the third liquid crystal domain and which extends substantially in parallel to the third direction; and a fourth slit which is formed in a region corresponding to the fourth liquid crystal domain and which extends substantially in parallel to the fourth direction;

in each of the first subpixel and the second subpixel, the first liquid crystal domain, the second liquid crystal domain, the third liquid crystal domain, and the fourth liquid crystal domain are arranged in this order along the pixel longitudinal direction of the pixel;

the first subpixel and the second subpixel adjoin each other along the pixel transverse direction; and a boundary between the first subpixel and the second subpixel includes a portion which is substantially parallel to the first slit, a portion which is substantially parallel to the second slit, a portion which is substantially parallel to the third slit, and a portion which is substantially parallel to the fourth slit.

[Item 2]

The liquid crystal display apparatus of Item 1, wherein, when an azimuth angle of the pixel transverse direction of each pixel is defined as 0°, the first direction, the second direction, the third direction, and the fourth direction are, respectively, substantially the 225° direction, substantially the 135° direction, substantially the 315° direction, and substantially the 45° direction.

[Item 3]

The liquid crystal display apparatus of Item 1, wherein, when an azimuth angle of the pixel transverse direction of each pixel is defined as 0°, the first direction, the second direction, the third direction, and the fourth direction are, respectively, substantially the 315° direction, substantially the 45° direction, substantially the 225° direction, and substantially the 135° direction.

[Item 4]

The liquid crystal display apparatus of any of Items 1 to 3, wherein each of the first alignment film and the second alignment film is a photo-alignment film.

[Item 5]

The liquid crystal display apparatus of any of Items 1 to 4, wherein, in each of the first liquid crystal domain, the second liquid crystal domain, the third liquid crystal domain, and the fourth liquid crystal domain of each pixel, a pretilt direction that is defined by the first alignment film and a pretilt direction that is defined by the second alignment film are substantially antiparallel.

An embodiment of the present invention allows to improve transmittance of a VA mode liquid crystal display apparatus in which an alignment division structure is formed by using alignment films to define pretilt directions and in which the pixel division driving technique is applied.

BRIEF DESCRIPTION OF THE DRAWINGS

FIG. 6C is a diagram for describing a method for obtaining the alignment division structure of the pixel 1000P, showing, after the active matrix substrate and the counter substrate are attached together, tilt directions (directors) occurring when a voltage is applied across the liquid crystal layer.

DETAILED DESCRIPTION

[Terminology]

First, certain essential terms used in the present specification will be explained.

In the present specification, a "liquid crystal layer of vertical alignment type" means a liquid crystal layer in which liquid crystal molecules are aligned substantially perpendicularly to the surface of an alignment film (vertical alignment film) (e.g., at an angle of about 85° or more). The liquid crystal molecules contained in the liquid crystal layer of vertical alignment type have a negative anisotropy of dielectric constant. Displaying under the normally black mode can be achieved by combining a liquid crystal layer of vertical alignment type and a pair of polarizers which are placed in crossed Nicols (i.e., so that their respective transmission axes are substantially orthogonal to each other), such that the polarizers oppose each other via the liquid crystal layer.

In the present specification, a "pixel" means a smallest unit that expresses a certain gray scale level in displaying; in the case of color displaying, a "pixel" corresponds to a unit that expresses respective gray scale levels of R, G, and B, for example. A combination of an R pixel, a G pixel, and a B pixel constitutes one color displaying pixel. Moreover, in the present specification, any region of a liquid crystal display apparatus that corresponds to a "pixel" in terms of displaying (pixel region) is also referred to as a "pixel".

A "pretilt direction" means an alignment direction of a liquid crystal molecule that is defined by an alignment film, referring to an azimuthal direction within the display surface. Herein, an angle that the liquid crystal molecule makes with the surface of the alignment film is referred to as a "pretilt angle". As will be described later, an alignment treatment for an alignment film (i.e., a treatment for conferring the alignment film an ability to define a pretilt direction in a predetermined direction) is preferably achieved through a photo-alignment treatment.

By changing the combination of pretilt directions that are realized by a pair of alignment films opposing each other with a liquid crystal layer interposed therebetween, a four-split structure can be formed. By definition, a pixel (pixel region) that has been divided into four portions has four liquid crystal domains.

Figure 2A:
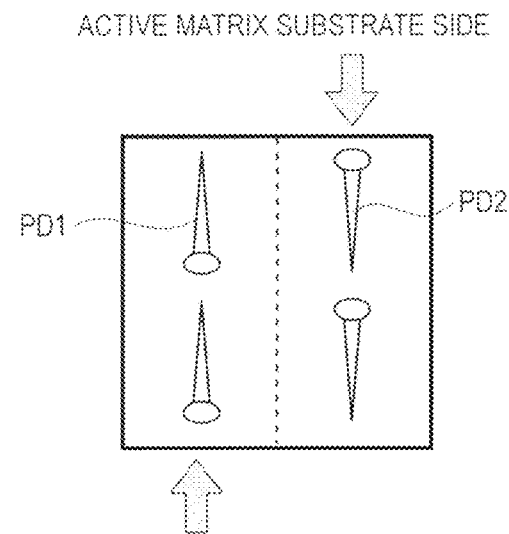
FIG. 2A is a diagram for describing a method for obtaining the alignment division structure of the pixel 900P, showing pretilt directions PD1 and PD2 which are defined by an alignment film provided on an active matrix substrate.
Figure 2B:
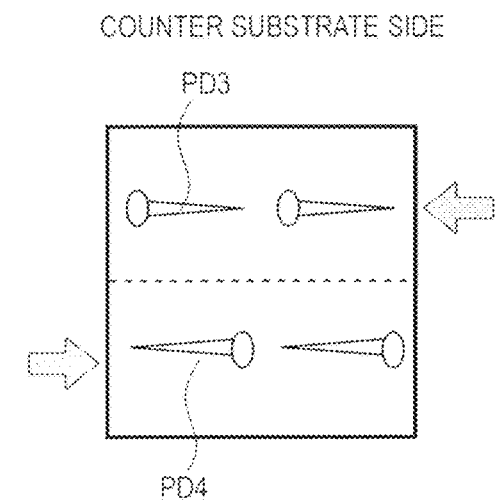
FIG. 2B is a diagram for describing a method for obtaining the alignment division structure of the pixel 900P, showing pretilt directions PD3 and PD4 which are defined by an alignment film provided on a counter substrate.
Figure 2C:
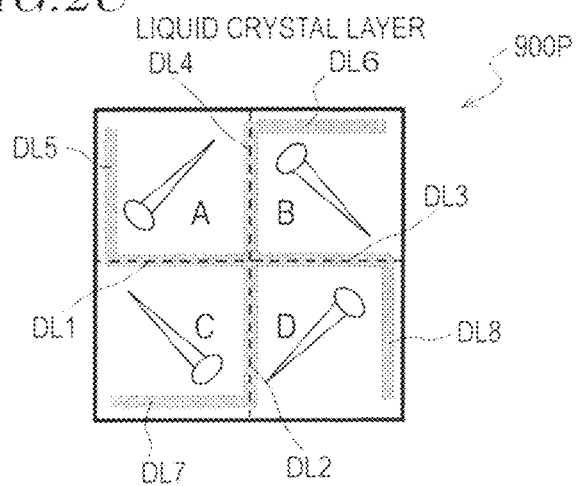
FIG. 2C is a diagram for describing a method for obtaining the alignment division structure of the pixel 900P, showing, after the active matrix substrate and the counter substrate are attached together, tilt directions (directors) occurring when a voltage is applied across the liquid crystal layer.

Each liquid crystal domain is characterized by the tilt direction (which may also be referred to as the "reference alignment direction") of liquid crystal molecules existing near the center of the layer plane of the liquid crystal layer and of its thickness direction when a voltage is applied across liquid crystal layer. This tilt direction (reference alignment direction) governs the viewing angle dependence of the domain. Regarding a tilted liquid crystal molecule, when one considers a vector from an end of the liquid crystal molecule that is closer to the rear-side substrate to its farther end (which is an end that is closer to the front-side substrate) (i.e., a vector from the tip end to the head of a pin that is illustrated in FIG. 2C discussed later), the "tilt direction" of the liquid crystal molecule is an orientation of a component of this vector within the substrate plane (i.e., a projection onto the substrate plane), which is an azimuthal direction. The azimuthal direction is to be referenced against the display surface as the horizontal direction, such that the direction of turning left reads positive (i.e., if the display surface were the face of a clock, the 3 o'clock direction would be an azimuth angle of 0°, and the counterclockwise direction would be positive). When the tilt directions of the four liquid crystal domains are set to four directions such that the angle between any two directions is substantially equal to an integer multiple of 90° (e.g., the 10:30 direction, the 7:30 direction, the 4:30 direction, the 1:30 direction), the viewing angle characteristics will be averaged out, and good displaying can be achieved. From the standpoint of uniformity of viewing angle characteristics, it is preferable that the respective areas which the four liquid crystal domains account for in the pixel region are substantially equal to one another.

A liquid crystal layer of vertical alignment type that is illustrated in any of the following embodiments contains liquid crystal molecules having a negative anisotropy of dielectric constant (i.e., a nematic liquid crystal material having a negative anisotropy of dielectric constant), such that the pretilt direction defined by one alignment film and the pretilt direction defined by the other alignment film are substantially antiparallel to each other. In connection with these two pretilt directions, the aforementioned tilt direction (reference alignment direction) is defined to be an azimuthal direction substantially identical with the pretilt direction that is ascribable to the rear-side alignment film, and when a voltage is applied across the liquid crystal layer, the liquid crystal molecules do not take a twist alignment. Preferably, the respective pretilt angles that are defined by the pair of alignment films are substantially equal to each other.

From the standpoint of mass producibility, a preferable alignment treatment for each alignment film is a photo-alignment treatment. Moreover, a photo-alignment treatment can be carried out without involving any physical contact, and therefore it does not induce any static electricity associated with friction, as would be caused by a rubbing treatment; thus, deteriorations in production yield can be prevented. Furthermore, use of a photo-alignment film containing a photosensitive group will help variations in the pretilt angle to be reduced.

[4D-RTN Mode Alignment Division Structure]

An alignment division structure under the 4D-RTN mode will be described.

Figure 1:
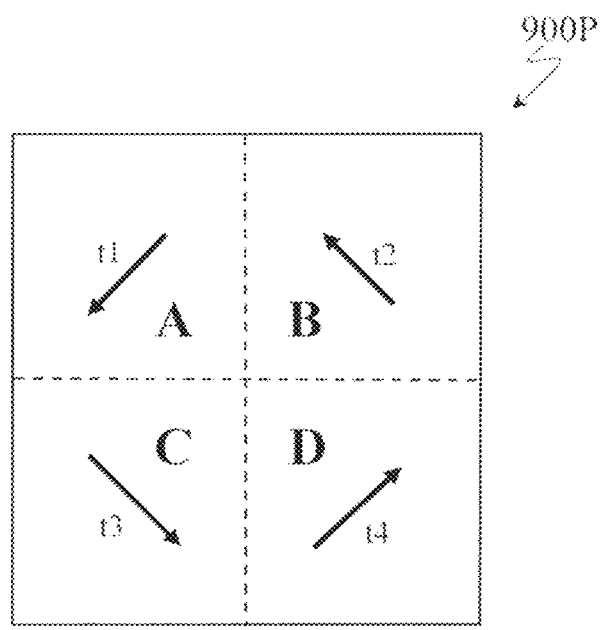
FIG. 1 is a diagram showing an alignment division structure of a pixel 900P of a generic 4D-RTN mode liquid crystal display apparatus.

FIG. 1 shows an alignment division structure of a pixel 900P of a generic 4D-RTN mode liquid crystal display apparatus. While a voltage is applied across the liquid crystal layer, four liquid crystal domains A, B, C and D are created in the pixel 900P, as shown in FIG. 1. The four liquid crystal domains A, B, C and D are arranged in a matrix of two rows and two columns.

The azimuths of directors t1, t2, t3 and t4 of the liquid crystal domains A, B, C and D are four azimuths such that the angle between any two azimuths is substantially equal to an integer multiple of 90°. The directors t1, t2, t3 and t4 are representative alignment directions of the liquid crystal molecules contained in each liquid crystal domain; under the 4D-RTN mode, the director of each liquid crystal domain is the tilt direction of liquid crystal molecules existing near the center of the layer plane of the liquid crystal layer and of its thickness direction when a voltage is applied across liquid crystal layer (i.e., located near the center when the liquid crystal domain is viewed in the normal direction of the display surface and also when the liquid crystal domain is viewed in a cross section taken along the normal direction of the display surface). Each liquid crystal domain is characterized by the azimuth (i.e., the aforementioned tilt direction) of the director, and the azimuth of this director governs the viewing angle dependence of the domain.

Herein, the pair of polarizers, opposing each other with a liquid crystal layer interposed therebetween, are disposed so that their respective transmission axes (polarization axes) are orthogonal to each other. More specifically, the pair of polarizers are disposed so that one of their transmission axes is parallel to the horizontal direction (3 o'clock direction, 9 o'clock direction) of the display surface and that the other transmission axis is parallel to the vertical direction (12 o'clock direction, 6 o'clock direction) of the display surface.

Given that the azimuth angle (3 o'clock direction) of the horizontal direction on the display surface is 0°, then the azimuth of the director t1 of the liquid crystal domain A is substantially the 225° direction, the azimuth of the director t2 of the liquid crystal domain B is substantially the 135° direction, the azimuth of the director t3 of the liquid crystal domain C is substantially the 315° direction, and the azimuth of the director t4 of the liquid crystal domain D is substantially the 45° direction. In other words, the liquid crystal domains A, B, C and D are disposed so that, the azimuths of their respective directors differ by substantially 90° between adjacent liquid crystal domains.

Now, with reference to FIG. 2A, FIG. 2B, and FIG. 2C, a method of alignment division for obtaining the alignment division structure of the pixel 900P shown in FIG. 1 will be described. FIG. 2A shows the pretilt directions PD1 and PD2 which are defined by an alignment film provided on an active matrix substrate, whereas FIG. 2B shows pretilt directions PD3 and PD4 which are defined by an alignment film provided on a counter substrate. FIG. 2C shows, after the active matrix substrate and the counter substrate are attached together, tilt directions (directors) established when a voltage is applied across the liquid crystal layer. In FIG. 2A, FIG. 2B, and FIG. 2C, the active matrix substrate, the counter substrate, and the liquid crystal layer are illustrated as seen from the viewer's side. Therefore, in FIG. 2A, the alignment film is located frontward of the plane of the figure relative to the substrate; in FIG. 2B, the alignment film is located rearward of the plane of the figure relative to the substrate. Moreover, each pretilt direction or tilt direction is schematically represented as a pin shape, such that the head (i.e., the end having a larger area) of the pin represents the end at the front side (the viewer's side) of the liquid crystal molecule, while the tip end (i.e., the end having a smaller area) of the pin represents the end at the rear side of the liquid crystal molecule.

The depicted region (which is a region corresponding to one pixel 900P) across the active matrix substrate is, as shown in FIG. 2A, divided into two portions of right and left; these two portions have been subjected to alignment treatments such that the respective regions (i.e., the left-hand region and the right-hand region) of the alignment film (vertical alignment film) define pretilt directions PD1 and PD2 which are antiparallel to each other. Herein, photo-alignment treatments have been performed by obliquely radiating ultraviolet (e.g., linearly-polarized ultraviolet) from respective directions indicated by arrows.

On the other hand, the depicted region (which is a region corresponding to one pixel 900P) across the counter substrate is, as shown in FIG. 2B, divided into two portions of upper and lower; these two portions have been subjected to alignment treatments such that the respective regions (i.e., the upper region and the lower region) of the alignment film (vertical alignment film) define pretilt directions PD3 and PD4 which are antiparallel to each other. Herein, photo-alignment treatments have been performed by obliquely radiating ultraviolet (e.g., linearly-polarized ultraviolet) from respective directions indicated by arrows.

By attaching together the active matrix substrate and the counter substrate which have been subjected to alignment treatments as illustrated in FIG. 2A and FIG. 2B, a pixel 900P having an alignment division as shown in FIG. 2C can be formed. As can be seen from FIG. 2A, FIG. 2B, and FIG. 2C, for each of liquid crystal domains A through D, the pretilt direction defined by the photo-alignment, film on the active matrix substrate and the pretilt direction defined by the photo-alignment film on the counter substrate differ by substantially 90° from each other, and the tilt direction (i.e., the azimuth of the director of each liquid crystal domain) is defined to be an intermediate direction between these two pretilt directions.

Figure 3:
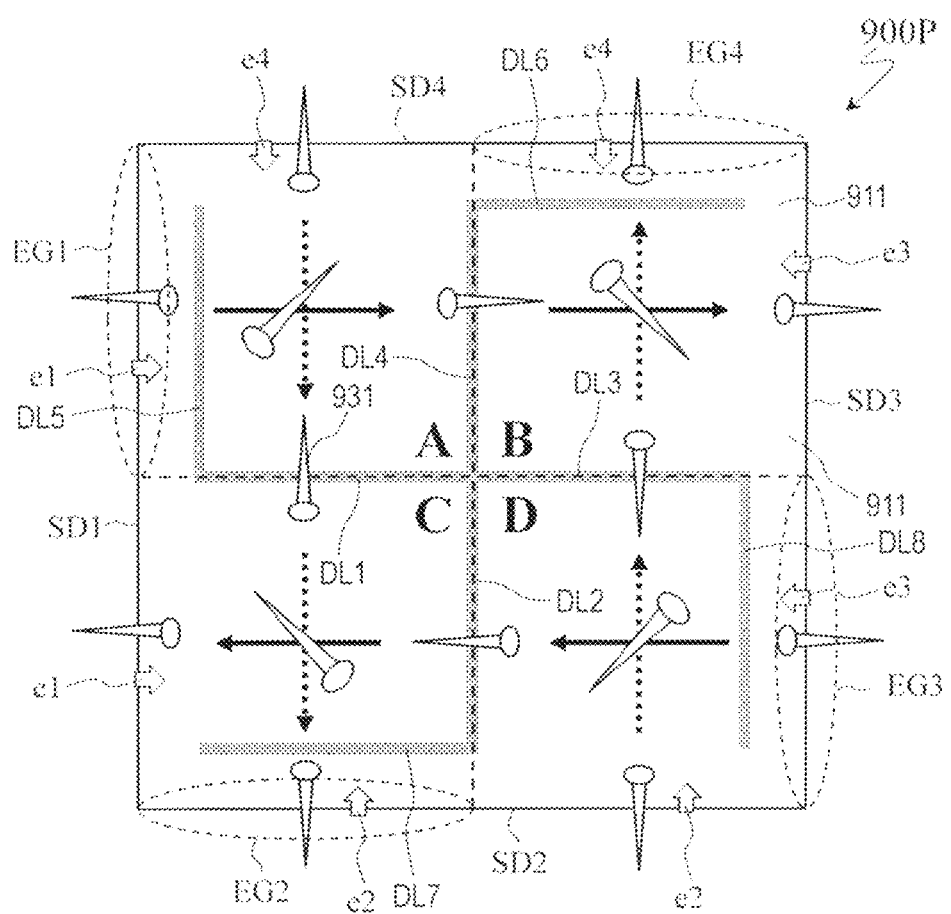
FIG. 3 is a diagram schematically showing orientations of liquid crystal molecules 931 in the pixel 900P.

Moreover, as shown in FIG. 2C, dark lines DL1 through DL8 occur within the pixel 900P having the alignment division structure. The dark lines DL1 through DL8 include: dark lines DL1 through DL4 occurring at boundaries between adjacent liquid crystal domains; and dark lines DL5 through DL8 occurring near the edges of the pixel electrode. In the example shown in FIG. 2C, the dark lines DL1 through DL8 present a reverse "卍" shape as a whole. Hereinafter, with reference to FIG. 3, the reason why such dark lines DL1 through DL8 occur will foe described. FIG. 3 is a diagram schematically showing orientations of liquid crystal molecules 931 in the pixel 900P.

First, the reason why the dark lines DL1 through DL4 occur will be described.

When a voltage is applied between the pixel electrode 911 and the counter electrode, a vertical electric field(s) is generated across the liquid crystal layer, causing the liquid crystal molecules 931 in the liquid crystal layer to be aligned in a direction(s) that is orthogonal to the electric field(s). In other words, the liquid crystal molecules 931 fall (i.e., incline) so as to become in parallel to the substrate plane. At this time, the azimuth of the director of the liquid crystal molecules 931 in each liquid crystal domain is defined by a pretilt direction that is ascribable to the alignment film on the active matrix substrate (indicated by a dotted-line arrow in FIG. 3) and by a pretilt direction that is ascribable to the alignment film on the counter substrate (indicated by a solid-line arrow in FIG. 3). Specifically, the azimuths of the directors of the liquid crystal domains A, B, C and D are, respectively, substantially the 225° direction, substantially the 135° direction, substantially the 315° direction, and substantially the 45° direction.

Near the boundaries between adjacent liquid crystal domains, the alignment direction of the liquid crystal molecules 931 changes continuously (owing to the nature of liquid crystal being a continuous elastic medium). Therefore, at the boundary between the liquid crystal domain A and the liquid crystal domain C, for example, the liquid crystal molecules 931 are aligned in substantially the 270° direction. Similarly, at the boundary between the liquid crystal domain C and the liquid crystal domain D, the boundary between the liquid crystal domain D and the liquid crystal domain B, and the boundary between the liquid crystal domain B and the liquid crystal domain A, the liquid crystal molecules 931 are aligned in the substantially 0° direction, substantially the 90° direction, and substantially the 180° direction, respectively. Since the 0° direction, the 90° direction, the 180° direction, and the 270° direction are parallel or orthogonal to the respective transmission axes of the pair of polarizers, the dark lines DL1 through DL4 occur at the boundaries between adjacent liquid crystal domains.

Next, the reason why the dark lines DL5 through DL8 occur will be described.

For a given liquid crystal domain, if the edge of the pixel electrode 911 to which the liquid crystal domain is closely located includes a portion (hereinafter referred to as an "edge subsection") such that an azimuthal direction which is orthogonal to this portion and which extends into the pixel electrode 911 makes an angle of more than 90° with the tilt direction (reference alignment direction) of the liquid crystal domain, then a dark line will occur inward of this edge subsection, so as to be in parallel to the edge subsection.

As shown in FIG. 3, the pixel electrode 911 has four edges (sides) SD1, SD2, SD3 and SD4. An oblique electric field that is generated at each of these edges SD1, SD2, SD3 and SD4 under an applied voltage exhibits an alignment regulating force having a component in a direction (azimuthal direction) which is orthogonal to the edge and which extends into the pixel electrode 911. In FIG. 3, azimuthal directions which are orthogonal to the four edges SD1, SD2, SD3 and SD4 and which extend into the pixel electrode 911 are indicated by arrows e1, e2, e3 and e4, respectively.

Each of the four liquid crystal domains A, B, C and D is closely located to two of the four edges SD1, SD2, SD3 and SD4 of the pixel electrode 911, and under an applied voltage is susceptible to the alignment regulating force caused by an oblique electric field generated at the respective edge.

Regarding the edges of the pixel electrode 911 to which the liquid crystal domain A is closely located, at an edge subsection EG1 (which is an upper half of the left edge SD1), the azimuthal direction e1 being orthogonal to the edge subsection EG1 and extending into the pixel electrode 911 makes an angle of more than 90° (or specifically, substantially 135°) with the tilt direction t1 of the liquid crystal domain A. As a result of this, in the liquid crystal domain A, the dark line DL5 occurs in parallel to the edge subsection EG1 under an applied voltage.

For similar reasons, in the other liquid crystal domains B, C and D, the dark lines DL6, DL7 and DL8 occur in parallel to, respectively, the edge subsection EG4 (i.e., a right half of the upper edge SD4), the edge subsection EG2 (i.e., a left half of the lower edge SD2), and the edge subsection EG3 (i.e., a lower half of the right edge SD3), under an applied voltage.

Figure 4:
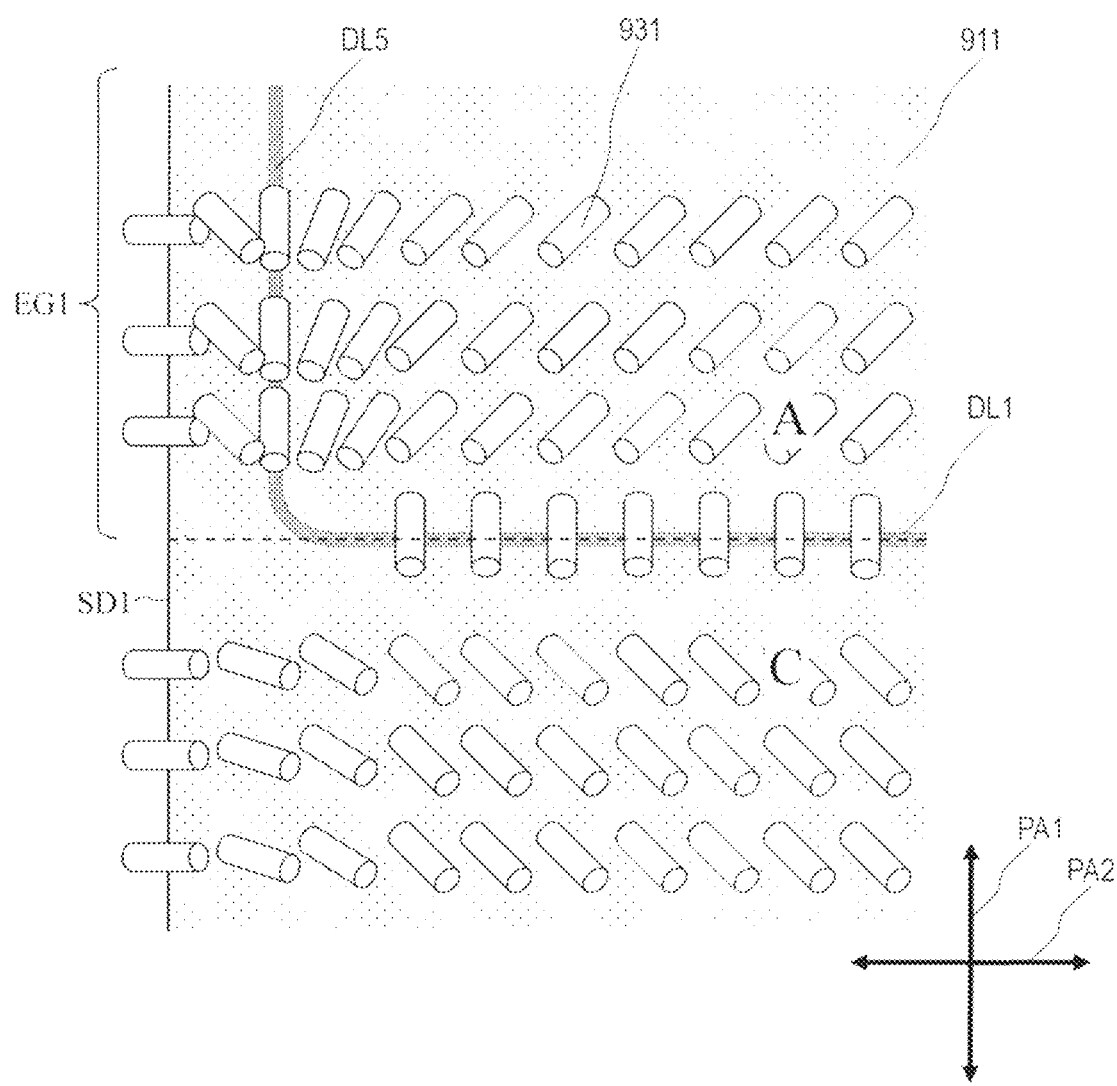
FIG. 4 is a plan view showing orientations of liquid crystal molecules 931 near an edge SD1 of a pixel electrode 911.

FIG. 4 shows orientations of liquid crystal molecules 931 near the edge SD1. As shown in FIG. 4, near the edge subsection EG1 of the edge SD1, the alignment continuously changes from a direction that is orthogonal to the edge SD1 (substantially 0° direction) to the tilt direction t1 of the liquid crystal domain A (substantially the 225° direction); as a result, there exists a region where the liquid crystal molecules 931 are aligned in a direction (substantially the 270° direction) that is substantially parallel or substantially orthogonal to the transmission axes PA1 and PA2 of the pair of polarizers. This region is the dark line DL5.

On the other hand, near any portion of the edge SD1 other than the edge subsection EG1, the alignment continuously changes from a direction that is orthogonal to the edge SD1 (substantially 0° direction) to the tilt direction t₁ of the liquid crystal domain C (substantially the 315° direction), but there exists no region where the liquid crystal molecules 931 are aligned in a direction substantially parallel or substantially orthogonal to the transmission axes PA1 and PA2 of the polarizers. Therefore, no dark line occurs.

For similar reasons, the above also applies to the other edges SD2, SD3 and SD4; while the dark lines DL7, DL8 and DL6 occur near the edge subsections EG2, EG3 and EG4, no dark line occurs near any portion other than the edge subsections EG2, EG3 and EG4.

The dark lines occurring through the aforementioned mechanism may cause deteriorations in pixel transmittance.

[Single Column Arrangement of Liquid Crystal Domains]

A single column arrangement of liquid crystal domains will now be described.

Figure 5:
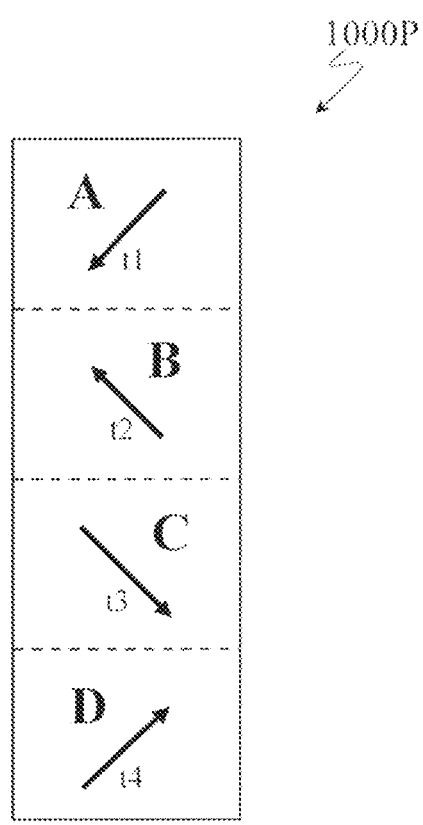
FIG. 5 is a diagram showing an alignment division structure of a pixel 1000P in which liquid crystal domains are arranged in one column.

FIG. 5 shows an example of a pixel 1000P in which liquid crystal domains are arranged in one column. While a voltage is applied across the liquid crystal layer, the four liquid crystal domains A, B, C and D are created in the pixel 1000P, as shown in FIG. 5. The four liquid crystal domains A, B, C and D are arranged in four rows and one column. In the example shown in FIG. 5, the four liquid crystal domains A, B, C and D are arranged in this order from the upper side to the lower side of the pixel 1000P.

Figure 6A:
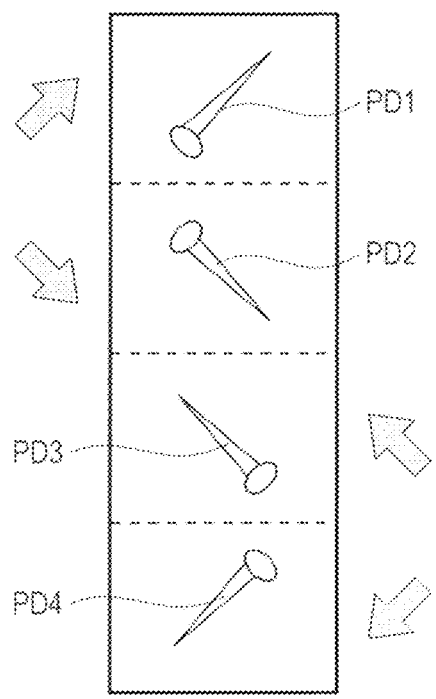
FIG. 6A is a diagram for describing a method for obtaining the alignment division structure of the pixel 1000P, showing pretilt directions PD1, PD2, PD3 and PD4 defined by an alignment film provided on the active matrix substrate.
Figure 6B:
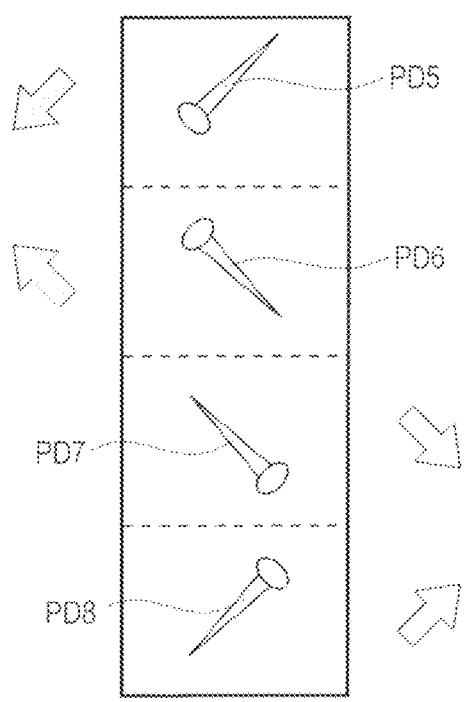
FIG. 6B is a diagram for describing a method for obtaining the alignment division structure of the pixel 1000P, showing pretilt directions PD5, PD6, PD7 and PD8 defined by an alignment film provided on the counter substrate.

Now, with reference to FIG. 6A, FIG. 6B and FIG. 6C, a method of alignment division for obtaining the alignment division structure of the pixel 1000P shown in FIG. 5 will be described. FIG. 6A shows pretilt directions PD1, PD2, PD3 and PD4 defined by an alignment film provided on the active matrix substrate, whereas FIG. 6B shows pretilt directions PD5, PD6, PD7 and PD8 defined by an alignment film provided on the counter substrate. FIG. 6C shows, alter the active matrix substrate and the counter substrate are attached together, tilt directions (directors) occurring when a voltage is applied across the liquid crystal layer.

The depicted region (which is a region corresponding to one pixel 1000P) across the active matrix substrate is, as shown in FIG. 6A, divided into four portions along the top-bottom direction; these four portions have been subjected to alignment treatments such that the respective regions of the alignment film (vertical alignment film) define respectively different pretilt directions PD1, PD2, PD3 and PD4. Herein, photo-alignment treatments have been performed by obliquely radiating ultraviolet (e.g., linearly-polarized ultraviolet) from respective directions indicated by arrows.

The depicted region (which is a region corresponding to one pixel 1000P) across the counter substrate is, as shown in FIG. 6B, also divided into four portions along the top-bottom direction; these four portions have been subjected to alignment treatments such that the respective regions of the alignment film (vertical alignment film) respectively different pretilt directions PD5, PD6, PD7 and PD8. Herein, photo-alignment treatments have been performed by obliquely radiating ultraviolet (e.g., linearly-polarized ultraviolet) from respective directions indicated by arrows.

By attaching together the active matrix substrate and the counter substrate which have been subjected to alignment treatments as illustrated in FIG. 6A and FIG. 6B, a pixel 1000P having an alignment division as shown in FIG. 6C can be formed. For each of liquid crystal domains A through D, the pretilt direction defined by the photo-alignment film on the active matrix substrate and the pretilt direction defined by the photo-alignment film on the counter substrate are substantially antiparallel to each other. In each of liquid crystal domains A through D, the liquid crystal molecules have a twist angle of substantially 0°.

Moreover, as shown in FIG. 6C, dark lines DL1 through DL7 occur in the pixel 1000P having the alignment division structure. The dark lines DL1 through DL7 include: dark lines DL1 through DL3 occurring at boundaries between adjacent liquid crystal domains; and dark lines DL4 through DL7 occurring near the edges of the pixel electrode.

[Effects of Transmittance Improvement by a Single Column Arrangement of Liquid Crystal Domains]

Figure 7:
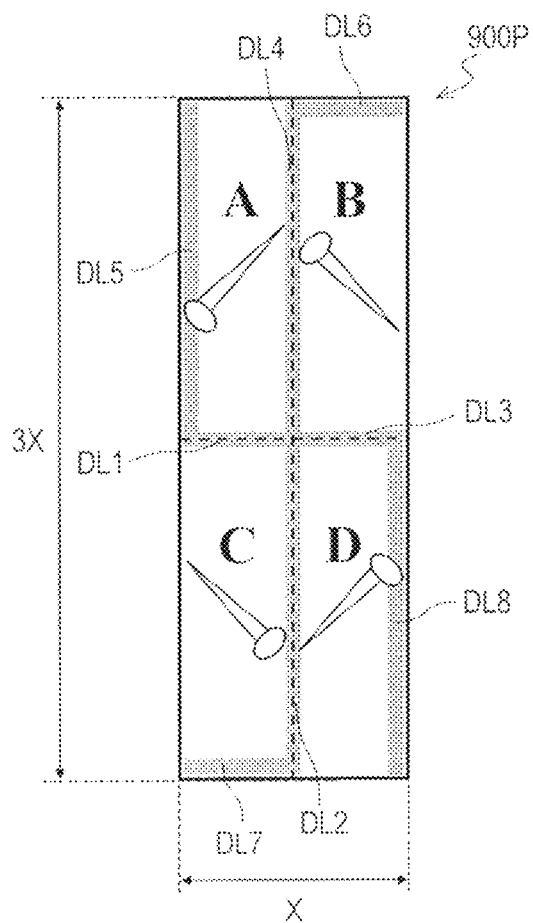
FIG. 7 is a diagram showing: on the left side, a pixel 900P in which liquid crystal domains are arranged in two rows and two columns; and on the right side, a pixel 1000P in which liquid crystal domains are arranged in one column.
Figure 7:
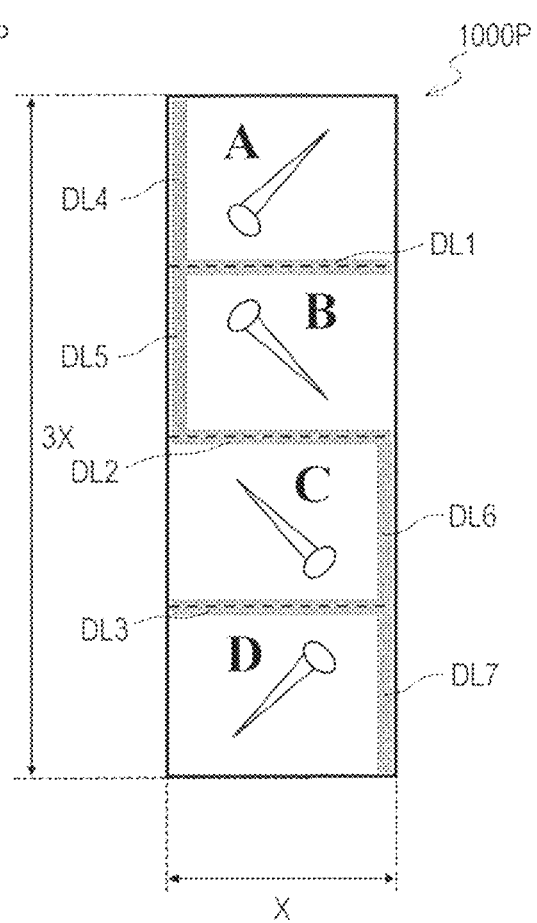

With reference to FIG. 7, the reasons why a single column arrangement of liquid crystal domains improves transmittance over that attained by a two-rows by two-columns arrangement will be described. Hereinafter, a case where the pixel has an aspect ratio (lateral length:vertical length) of 1:3 will be illustrated.

FIG. 7 shows, on the left side, a pixel 900P in which liquid crystal domains are arranged in two rows and two columns, and on the right side, a pixel 1000P in which liquid crystal domains are arranged in one column.

Now, dark lines occurring at boundaries between liquid crystal domains (dark lines DL1 through DL4 in the pixel 900P and the dark lines DL1 through DL3 in the pixel 1000P) will be discussed. Assuming that the pixel 900P or 1000P has a lateral length X, then its vertical length is 3X. Accordingly, the lengths of the dark lines DL1, DL2, DL3 and DL4 in the pixel 900P are about 0.5X, about 1.5X, about 0.5X, and about 1.5X, respectively, and a total of the lengths of the dark lines DL1 through DL4 is about 4X. On the other hand, the dark lines DL1, DL2 and DL3 in the pixel 1000P each have a length of about 1X, and a total of the lengths of the dark lines DL1 through DL3 is about 3X. Therefore, assuming that the dark lines DL1 through DL4 in the pixel 900P and the dark lines DL1 through DL3 in the pixel 1000P all have an equal width, then the total area of the dark lines DL1 through DL3 occurring at boundaries between liquid crystal domains in the pixel 1000P is smaller than the total area of the dark lines DL1 through DL4 occurring at boundaries between liquid crystal domains in the pixel 900P.

Thus, adopting a single column arrangement of liquid crystal domains allows the total area of dark lines occurring at boundaries between liquid crystal domains to be reduced, whereby transmittance can be improved.

[A New Problem Arising when the Pixel Division Driving Technique is Combined with a Single Column Arrangement]

As has already been described, a single column arrangement of liquid crystal domains can improve transmittance. However, combining the pixel division driving technique with the aforementioned single column arrangement (i.e., disposing eight liquid crystal domains within one pixel) may hardly improve transmittance, or conversely worsen transmittance. Hereinafter, the reasons thereof will be described with reference to FIG. 8.

When the pixel division driving technique is combined with an alignment division structure, from the standpoint of further improving the viewing angle characteristics, it is preferable that each of the plurality of subpixels includes four liquid crystal domains. In other words, when the pixel is divided into two subpixels, it is preferable that each of the two subpixels includes four liquid crystal domains, such that one pixel includes eight liquid crystal domains.

Figure 8:
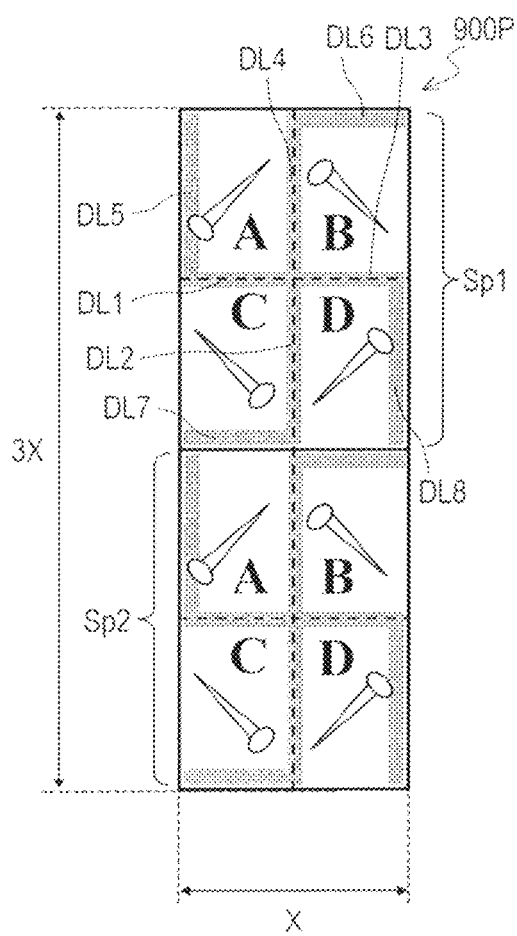
FIG. 8 is a diagram showing: on the left side, a pixel 900P' in which liquid crystal domains are arranged in two rows and two columns within each subpixel; and on the right side, a pixel 1000P' in which liquid crystal domains are arranged in one column within each subpixel.
Figure 8:
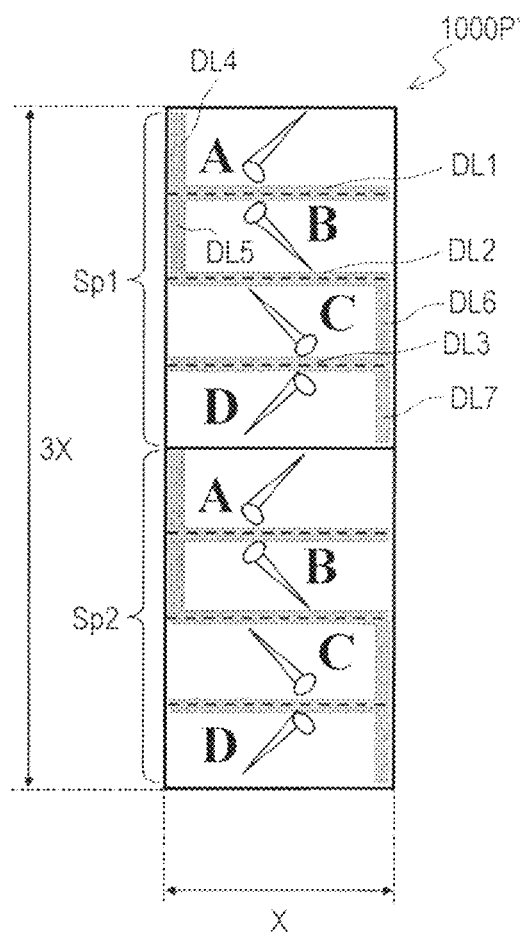

Pixels 900P' and 1000P' shown in FIG. 8 each include a first subpixel Sp1 and a second subpixel Sp2. The first subpixel Sp1 is disposed above the pixel 900P' or 1000P', whereas the second subpixel Sp2 disposed below the pixel 900P' or 1000P'. In other words, the pixels 900P' and 1000P' are each divided into two portions of upper or lower, such that the first subpixel Sp1 and the second subpixel Sp2 adjoin each other along the top-bottom direction (i.e., the longitudinal direction of the pixel). Respectively different voltages may be applied across the liquid crystal layer in the first subpixel Sp1 and the liquid crystal layer in the second subpixel Sp2.

Each of the first subpixel Sp1 and the second subpixel Sp2 in the pixel 900P' includes four liquid crystal domains A, B, C and D which are arranged in two rows and two columns. On the other hand, each of the first subpixel Sp1 and the second subpixel Sp2 in the pixel 1000P' includes four liquid crystal domains A, B, C and D which are arranged in four rows and one column.

Now, the dark lines occurring at boundaries between liquid crystal domains (dark lines DL1 through DL4 in the pixel 900P' and the dark lines DL1 through DL3 in the pixel 1000P') will be considered. Assuming that the pixel 900P' or 1000P' has a lateral length X, then its vertical length is 3X. Accordingly, the lengths of the dark lines DL1, DL2, DL3 and DL4 in the pixel 900P' are about 0.5X, about 3X/4, about 0.5X, and about 3X/4, respectively, and a total of the lengths of the dark lines DL1 through DL4 in the entire pixel 900P' is about 5X. On the other hand, the dark lines DL1, DL2 and DL3 in the pixel 1000P' each have a length of about 1X, and a total of the lengths of the dark lines DL1 through DL3 in the entire pixel 1000P' is about 6X. Therefore, assuming that the dark lines DL1 through DL4 in the pixel 900P' and the dark lines DL1 through DL3 in the pixel 1000P' all have an equal width, then the total area of the dark lines DL1 through DL3 occurring at boundaries between liquid crystal domains in the pixel 1000P' is larger than the total area of the dark lines DL1 through DL4 occurring at boundaries between liquid crystal domains in the pixel 900P'. Therefore, the pixel 1000P' is lower in transmittance than the pixel 900P'. Thus, when the pixel division driving technique is combined with an alignment division structure, adopting a single column arrangement will conversely worsen transmittance. This is because, under pixel division driving, a pixel is divided into a plurality of (e.g., two) subpixels, which means that the aspect ratio of each subpixel becomes smaller than the aspect ratio of the pixel. For example, when the aspect ratio of the pixel is 1:3, and the pixel is equally divided, the aspect ratio of each subpixel is lowered to 1:1.5 or less.

Liquid crystal display apparatuses according to embodiments of the present invention have configurations as described below, whereby the total area of dark lines occurring in the pixel can be reduced. This allows to improve the transmittance of a VA mode liquid crystal display apparatus in which an alignment division structure is formed and in which the pixel division driving technique is applied.

Hereinafter, embodiments of the present invention will be described with reference to the drawings. Note that the present invention is not limited to the following embodiments.

Embodiment 1

Figure 9:
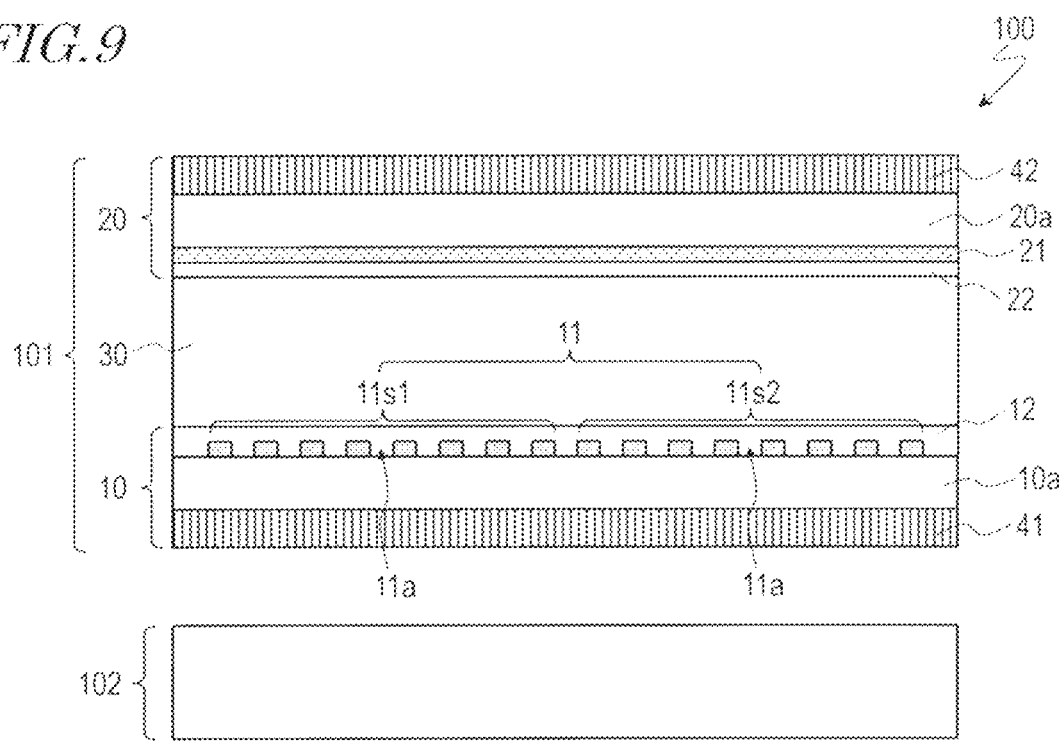
FIG. 9 is a cross-sectional view schematically showing a liquid crystal display apparatus 100 according to an embodiment of the present invention.

With reference to FIG. 9, a liquid crystal display apparatus 100 according to the present embodiment will be described. FIG. 9 is a cross-sectional view schematically showing the liquid crystal display apparatus 100.

As shown in FIG. 9, the liquid crystal display apparatus 100 includes a liquid crystal display panel 101 and a backlight (lighting device) 102. The liquid crystal display panel 101 includes an active matrix substrate (first substrate) 10 and a counter substrate (second substrate) 20 opposing each other, and a liquid crystal layer of vertical alignment type 30 interposed therebetween. The backlight 102 is disposed on the rear side (the opposite side to the viewer) of the liquid crystal display panel 101. Moreover, the liquid crystal display apparatus 100 includes a plurality of pixels arranged in a matrix.

The active matrix substrate 10 includes a pixel electrode 11, which is one of a plurality that are respectively formed for the plurality of pixels, and a first alignment film 12 that is provided between the pixel electrode 11 and the liquid crystal layer 30 (i.e., on the outermost surface of the active matrix substrate 10 facing toward the liquid crystal layer 30). The pixel electrode 11 and the first alignment film 12 are provided in this order, on the surface of the substrate 10a facing toward the liquid crystal layer 30. In other words, the pixel electrode 11 and the first alignment film 12 are supported by the substrate 10a. The substrate 10a is transparent and electrically insulative. The substrate 10a may be a glass substrate or a plastic substrate, for example.

The pixel electrode 11 is made of a transparent electrically conductive material (e.g., ITO). The pixel electrode 11 includes a first subpixel electrode 11s1 and a second subpixel electrode 11s2. Each of the first subpixel electrode 11s1 and the second subpixel electrode 11s2 has a plurality of slits 11a.

The counter substrate 20 includes a counter electrode 21 opposing the pixel electrode 11, and a second alignment film 22 interposed between the counter electrode 21 and the liquid crystal layer 30 (i.e., on the outermost surface of the counter substrate 20 facing toward the liquid crystal layer 30).

The counter electrode 21 and the second alignment film 22 are provided in this order, on the surface of the substrate 20a facing toward the liquid crystal layer 30. In other words, the counter electrode 21 and the second alignment film 22 are supported by the substrate 20a. The substrate 20a is transparent and electrically insulative. The substrate 20a may be a glass substrate or a plastic substrate, for example. The counter electrode 21 is made of a transparent electrically conductive material (e.g., ITO). The counter electrode 21 may be a continuous electrically conductive film that is formed across the entire display region. In other words, the counter electrode 21 may be a common electrode that is capable of supplying a common potential to all pixels.

Although not shown herein, in addition to the aforementioned counter electrode 21 and second photo-alignment film 22, the counter substrate 20 also includes a color filter layer and a light shielding layer (black matrix). The color filter layer may typically include red color filters, green color filters, and blue color filters.

The first alignment film 12 and the second alignment film 22 each have an alignment regulating force for aligning liquid crystal molecules substantially perpendicularly to their respective surface. In the present embodiment, the first alignment film 12 and the second alignment film 22 have been subjected to photo-alignment treatments. In other words, each of the first alignment film 12 and the second alignment film 22 is a photo-alignment film.

The liquid crystal display apparatus 100 further includes a pair of polarizers 41 and 42 opposing each other via the liquid crystal layer 30. The pair of polarizers 41 and 42 are disposed so that their respective transmission axes are substantially orthogonal to each other (i.e., in crossed Nicols).

Figure 10:
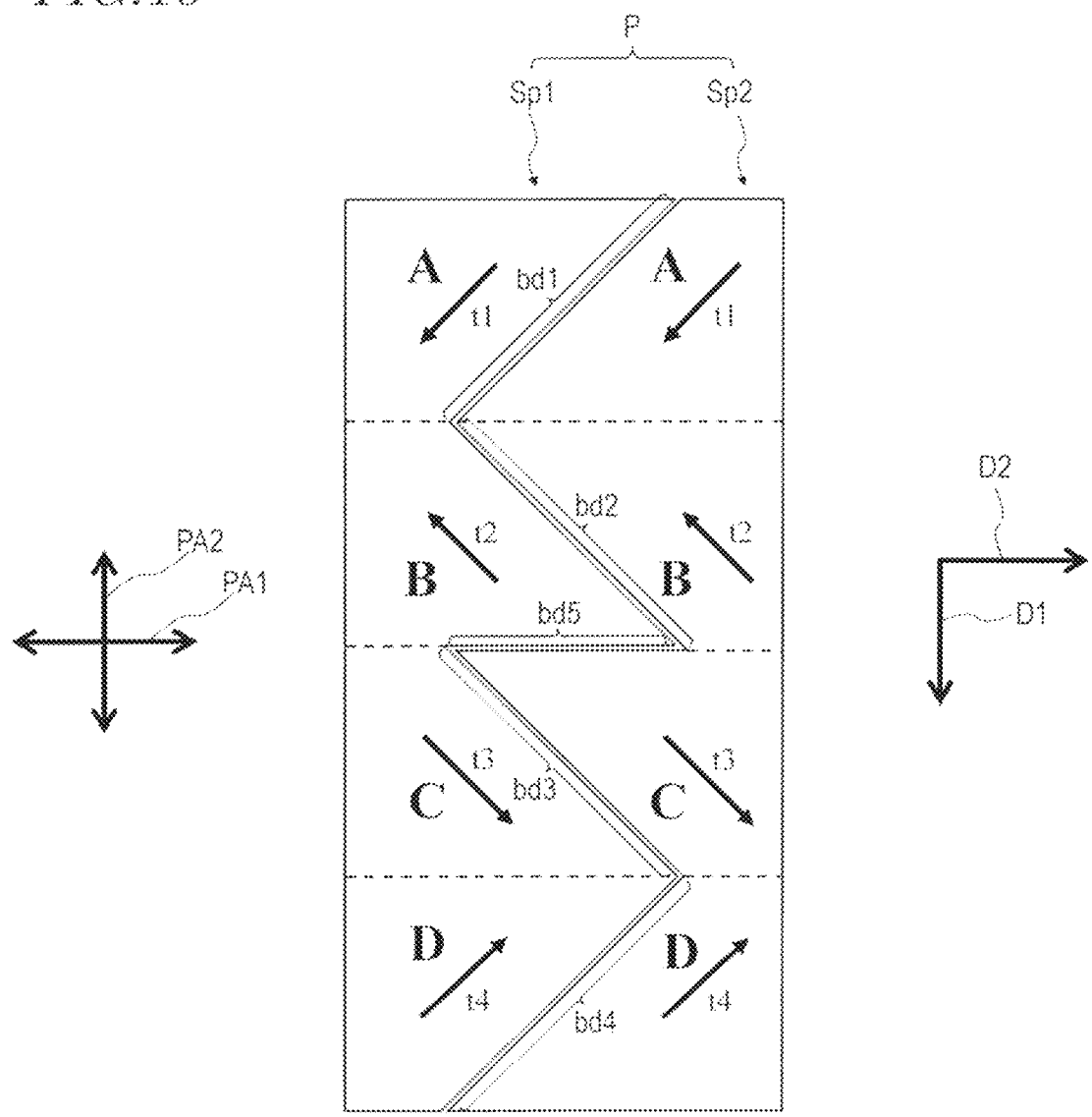
FIG. 10 is a diagram showing an alignment division structure of a pixel P of the liquid crystal display apparatus 100.

Next, with reference to FIG. 10, a more specific configuration of the liquid crystal display apparatus 100 will be described. FIG. 10 is a diagram showing an alignment division structure of one pixel P of the liquid crystal display apparatus 100.

In the present embodiment, each pixel P of the liquid crystal display apparatus 100 has a substantially rectangular shape whose longitudinal direction D1 and transverse direction D2 are defined as shown in FIG. 10. Hereinafter, the longitudinal direction D1 and the transverse direction D2 of the pixel P may respectively be referred to as the "pixel longitudinal direction D1" and the "pixel transverse direction D2".

As shown in FIG. 10, each pixel P includes a first subpixel Sp1 and a second subpixel Sp2. Respectively different voltages are applied across the liquid crystal layer 30 in the first subpixel Sp1 and the liquid crystal layer 30 in the second subpixel Sp2. In other words, the liquid crystal display apparatus 100 performs pixel division driving. Herein, a relatively low voltage is applied across the liquid crystal layer 30 in the first subpixel Sp1, and a relatively high voltage is applied across the liquid crystal layer 30 in the second subpixel Sp2. Therefore, the first subpixel Sp1 is a "dark subpixel", whereas the second subpixel Sp2 is a "bright subpixel". In the present embodiment, the first subpixel Sp1 and the second subpixel Sp2 adjoin each other along the pixel transverse direction D2. In other words, the pixel P is divided into two subpixels (the first subpixel Sp1 and the second subpixel Sp2) along the pixel longitudinal direction D1.

When a voltage is applied between the pixel electrode 11 and the counter electrode 21, four liquid crystal domains A, B, C and D are created in the liquid crystal layer 30 within each of the first subpixel Sp1 and the second subpixel Sp2, as shown in FIG. 10. Four directors (reference alignment directions) t1, t2, t3 and t4 which are the respective representative alignment directions of the liquid crystal molecules contained in the liquid crystal domains A, B, C and D have different azimuths from one another.

Given that the azimuth angle (3 o'clock direction) of the horizontal direction on the display surface is 0°, then the azimuth of the director t1 of the liquid crystal domain A is substantially the 225° direction, the azimuth of the director t2 of the liquid crystal domain B is substantially the 135° direction, the azimuth of the director t3 of the liquid crystal domain C is substantially the 315° direction, and the azimuth of the director t4 of the liquid crystal domain D is substantially the 45° direction. In other words, the difference between any two among the azimuths of the four directors t1, t2, t3 and t4 of the liquid crystal domains A, B, C and D is substantially equal to an integer multiple of 90°. Moreover, in the present embodiment, the pixel transverse direction D2 is the horizontal direction on the display surface (that is, the pixel longitudinal direction D1 is the vertical direction on the display surface); therefore, the directors (reference alignment directions) t1, t2, t3 and t4 of the liquid crystal domains A, B, C and D each make an angle which is substantially equal to an odd multiple of 45° with respect to the pixel transverse direction D2. Note that, in the present specification, "substantially the 45° direction", "substantially the 135° direction", "substantially the 225° direction", and "substantially the 315° direction" respectively mean: "a 40° to 50° direction"; "a 130° to 140° direction"; "a 220° to 230° direction"; and "a 310° to 320° direction".

In the example shown in FIG. 10, in each of the first subpixel Sp1 and the second subpixel Sp2, the four liquid crystal domains A, B, C and D are arranged in four rows and one column. More specifically, in each of the first subpixel Sp1 and the second subpixel Sp2, the liquid crystal domains A, B, C and D are arranged in this order from above to below (i.e., along the pixel longitudinal direction D1). Hereinafter, the four liquid crystal domains as counted consecutively from above (i.e., the liquid crystal domains A, B, C and D) may be respective referred to as the "first liquid crystal domain", the "second liquid crystal domain", the "third liquid crystal domain", and the "fourth liquid crystal domain". Regarding the liquid crystal domains A, B, C and D, between any two adjacent liquid crystal domains, the azimuth of the director differs by substantially 90° or substantially 180°. More specifically, between the first liquid crystal domain (liquid crystal domain A) and the second liquid crystal domain (liquid crystal domain B), the azimuth of the director differs by substantially 90°. Between the second liquid crystal domain (liquid crystal domain B) and the third liquid crystal domain (liquid crystal domain C), the azimuth of the director differs by substantially 180°. Between the third liquid crystal domain (liquid crystal domain C) and the fourth liquid crystal domain (liquid crystal domain D), the azimuth of the director differs by substantially 90°.

One of the transmission axes (polarization axes) PA1 and PA2 of the pair of polarizers 41 and 42 is parallel to the horizontal direction on the display surface, while the other transmission axis is parallel to the vertical direction on the display surface. Therefore, the transmission axes PA1 and PA2 of the polarizers 41 and 42 make an angle of substantially 45° with the azimuths of directors t1, t2, t3 and t4 of the liquid crystal domains A, B, C and D.

Although FIG. 10 illustrates a case where the areas which the four liquid crystal domains A, B, C and D occupy within the pixel P are equal to one another, the areas of the four liquid crystal domains A, B, C and D may not be equal to one another. However, from the standpoint of uniformity of viewing angle characteristics, the difference between the areas of the four liquid crystal domains A, B, C and D is preferably as small as possible. The example of FIG. 10 merely illustrates an example of a most preferable (i.e., ideal) four-split structure in terms of viewing angle characteristics.

Figure 11:
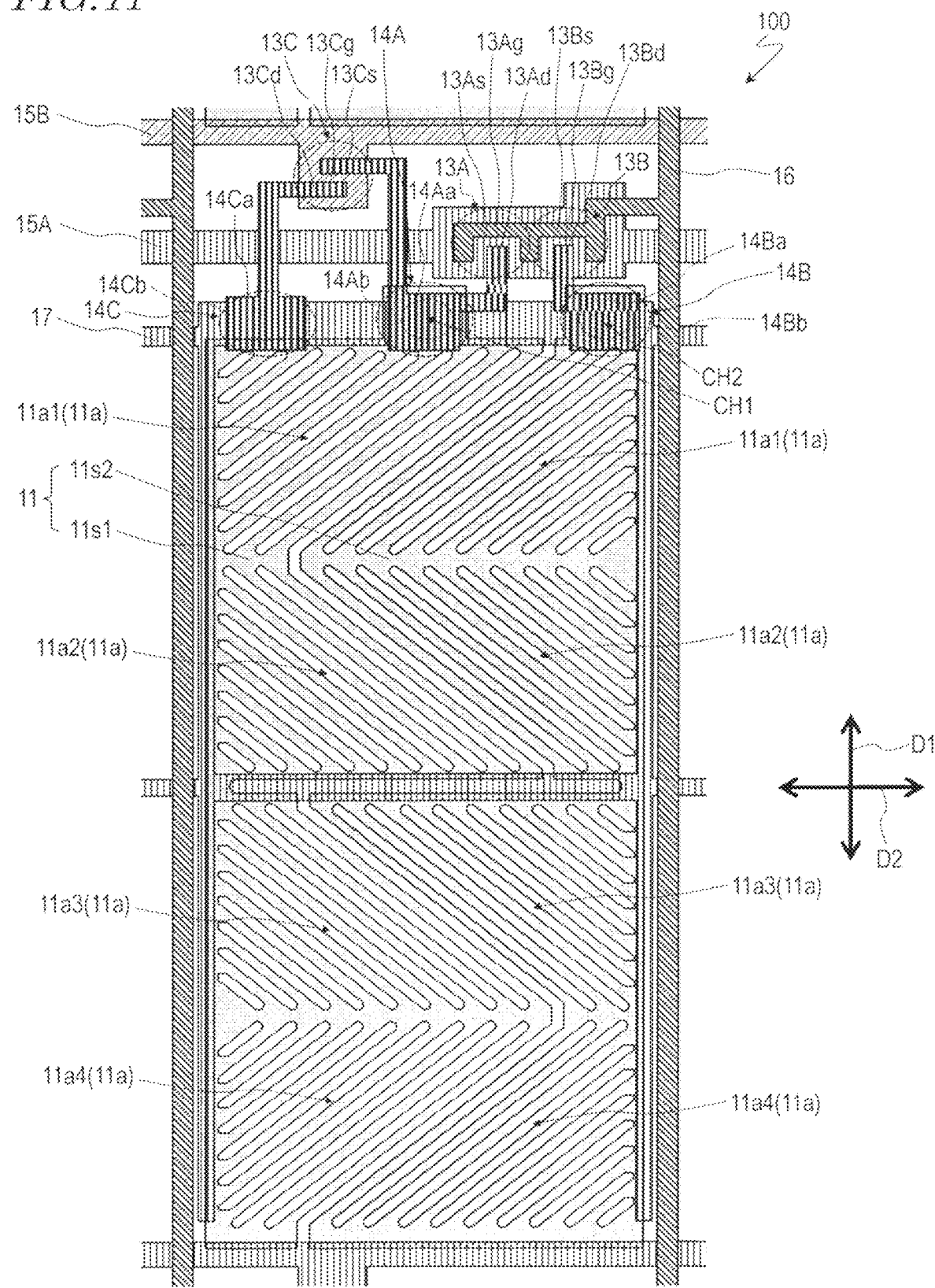
FIG. 11 is a plan view schematically showing the liquid crystal display apparatus 100, showing a region corresponding to one pixel P.

Next, with reference to FIG. 11, the structure of the liquid crystal display apparatus 100 (mainly with respect to the configuration of the active matrix substrate 10) will be described more specifically. FIG. 11 is a plan view showing a region of the liquid crystal display apparatus 100 corresponding to one pixel P.

As has already been explained, the pixel electrode 11 includes the first subpixel electrode 11s1 and the second subpixel electrode 11s2. The first subpixel electrode 11s1 is provided for the first subpixel Sp1, whereas the second subpixel electrode 11s2 is provided for the second subpixel Sp2.

Each of the first subpixel electrode 11s1 and the second subpixel electrode 11s2 has a plurality of slits 11a. The plurality of slits 11a include a plurality of first slits 11a1, a plurality of second slits 11a2, a plurality of third slits 11a3, and a plurality of fourth slit 11a4.

The first slits 11a1 are formed in a region corresponding to the liquid crystal domain A (first liquid crystal domain), extending substantially in parallel to the director t1 of the liquid crystal domain A. The second slits 11a2 are formed in a region corresponding to the liquid crystal domain B (second liquid crystal domain), extending substantially in parallel to the director t2 of the liquid crystal domain B. The third slits 11a3 are formed in a region corresponding to the liquid crystal domain C (third liquid crystal domain), extending substantially in parallel to the director t3 of the liquid crystal domain C. The fourth slit 11a4 are formed in a region corresponding to the liquid crystal domain D (fourth liquid crystal domain), extending substantially in parallel to the director t4 of the liquid crystal domain D.

As can be seen from FIG. 10 and FIG. 11, the boundary between the first subpixel Sp1 and the second subpixel Sp2 is defined by an edge of the first subpixel electrode 11s1 that is closer to the second subpixel electrode 11s2 and an edge of the second subpixel electrode 11s2 that is closer to the first subpixel electrode 11s1. In the present, embodiment, the boundary between the first subpixel Sp1 and the second subpixel Sp2 does not have a simple linear shape (a linear shape that would extend along the pixel longitudinal direction D1). As shown in FIG. 10 (and FIG. 11), the boundary between the first subpixel Sp1 and the second subpixel Sp2 includes: a portion (first portion) bd1 that is substantially parallel to the first slits 11a1; a portion (second portion) bd2 that is substantially parallel to the second slits 11a2; a portion (third portion) bd3 that is substantially parallel to the third slits 11a3; and a portion (fourth portion) bd4 that is substantially parallel to the fourth slit 11a4. The first portion bd1 is located between the liquid crystal domain A of the first subpixel Sp1 and the liquid crystal domain A of the second subpixel Sp2, whereas the second portion bd2 is located between the liquid crystal domain B of the first subpixel Sp1 and the liquid crystal domain B of the second subpixel Sp2. The third portion bd3 is located between the liquid crystal domain C of the first subpixel Sp1 and the liquid crystal domain C of the second subpixel Sp2, whereas the fourth portion bd4 is located between the liquid crystal domain D of the first subpixel Sp1 and the liquid crystal domain D of the second subpixel Sp2. Note that, in the example shown, the boundary between the first subpixel Sp1 and the second subpixel Sp2 also includes a portion (fifth portion) bd5 that is substantially parallel to none of the first slits 11a1, the second slits 11a2, the third slits 11a3, and the fourth slit 11a4.

In addition to the aforementioned pixel electrode 11 and first alignment film 12, the active matrix substrate 10 includes, corresponding to one pixel P: a first TFT 13A, a second TFT 13B, and a third TFT 13C; a first capacitance element 14A, a second capacitance element 14B, and a third capacitance element 14C; and a first gate line 15A and a second gate line 15B, a source line 16, and a storage capacitor line 17.

The first gate line 15A and the second gate line 15B each extend along a row direction. The source line 16 extends along a column direction. The storage capacitor line 17 generally extends along the row direction as a whole.

The first TFT 13A, the second TFT 13B, and the third TFT 13C respectively include: gate electrodes 13Ag, 13Bg and 13Cg; a gate insulating layer (not shown); a semiconductor layer (not shown); source electrodes 13As, 13Bs and 13Cs; and drain electrodes 13Ad, 13Bd and 13Cd.

The gate electrode 13Ag of the first TFT 13A is electrically connected to the first gate line 15A. In the example shown, a portion of the first gate line 15A (i.e., a portion overlapping the semiconductor layer of the first TFT 13A) functions as the gate electrode 13Ag. The source electrode 13As of the first TFT 13A is electrically connected to the source line 16. In the example shown, the source electrode 13As extends from the source line 16. The drain electrode 13Ad of the first TFT 13A is electrically connected to the first subpixel electrode 11s1.

The gate electrode 13Bg of the second TFT 13B is electrically connected to the first gate line 15A. In the example shown, a portion of the first gate line 15A (i.e., a portion overlapping the semiconductor layer of the second TFT 13B) functions as the gate electrode 13Bg. The source electrode 13Bs of the second TFT 13B is electrically connected to the source line 16. In the example shown, the source electrode 13Bs extends from the source line 16. The drain electrode 13Bd of the second TFT 13B is electrically connected to the second subpixel electrode 11s2.

The gate electrode 13Cg of the third TFT 13C is electrically connected to the second gate line 15B. In the example shown, the gate electrode 13Cg extends from the second gate line 15B. The source electrode 13Cs of the third TFT 13C is electrically connected to the drain electrode 13Ad of the first TFT 13A. The drain electrode 13Cd of the third TFT 13C is electrically connected to the third capacitance element 14C.

The first capacitance element 14A includes: a first storage capacitor electrode 14Aa which is electrically connected to the drain electrode 13Ad of the first TFT 13A; and a second storage capacitor electrode 14Ab which overlaps the first storage capacitor electrode 14Aa via the gate insulating layer. In the example shown, the first storage capacitor electrode 14Aa extends from the drain electrode 13Ad of the first TFT 13A. In a contact, hole CH1 which is formed so as to overlap the first storage capacitor electrode 14Aa, the first subpixel electrode 11s1 is connected to the first storage capacitor electrode 14Aa, such that the first subpixel electrode 11s1 is electrically connected to the drain electrode 13Ad of the first TFT 13A via the first storage capacitor electrode 14Aa. Moreover, in the example shown, a portion (a portion overlapping the first storage capacitor electrode 14Aa) of the storage capacitor line 17 functions as the second storage capacitor electrode 14Ab. The first capacitance element 14A functions as a storage capacitor for the first subpixel Sp1.

The second capacitance element 14B includes: a first storage capacitor electrode 14Ba that is electrically connected to the drain electrode 13Bd of the second TFT 13B; and a second storage capacitor electrode 14Bb that overlaps the first storage capacitor electrode 14Ba via the gate insulating layer. In the example shown, the first storage capacitor electrode 14Ba extends from the drain electrode 13Bd of the second TFT 13B. In a contact hole CH2 which is formed so as to overlap the first storage capacitor electrode 14Ba, the second subpixel electrode 11s2 is connected to the first storage capacitor electrode 14Ba, such that the second subpixel electrode 11s2 is electrically connected to the drain electrode 13Bd of the second TFT 13B via the first storage capacitor electrode 14Ba. Moreover, in the example shown, a portion of the storage capacitor line 17 (i.e., a portion overlapping the first storage capacitor electrode 14Ba) functions as the second storage capacitor electrode 14Bb. The second capacitance element 14B functions as a storage capacitor for the second subpixel Sp2.

The third capacitance element 14C includes: a first capacitor electrode 14Ca that is electrically connected to the drain electrode 13Cd of the third TFT 13C; and a second capacitor electrode 14Cb that overlaps the first capacitor electrode 14Ca via the gate insulating layer. In the example shown, the first capacitor electrode 14Ca extends from the drain electrode 13Cd of the third TFT 13C. Moreover, in the example shown, a portion of the storage capacitor line 17 (i.e., a portion overlapping the first capacitor electrode 14Ca) functions as the second capacitor electrode 14Cb.

In the liquid crystal display apparatus 100 having the configuration illustrated in FIG. 11, pixel division driving is performed as follows.

First, when vertical scanning period for a given pixel P is begun, a gate signal (scanning signal) that is supplied from the first gate line 15A to the first TFT 13A and the second TFT 13B goes HIGH. At this time, the first TFT 13A and the second TFT 13B take an ON state, whereby the first subpixel electrode 11s1 and the second subpixel electrode 11s2 are charged until reaching the same voltage, based on a source signal (display signal) that is supplied from the source line 16. Next, after charging is complete, upon lapse of a predetermined time (e.g. several μ sec to several tens of μ sec), a gate signal that is supplied from the second gate line 15B to the third TFT 13C goes HIGH. At this time, the third TFT 13C takes an ON state, whereby the first subpixel electrode 11s1 becomes electrically connected to the third capacitance element 14C via the third TFT 13C. The third capacitance element 14C was charged in a previous vertical scanning period in opposite polarities relative to the current vertical scanning period; therefore, as the first subpixel electrode 11s1 becomes connected to the third capacitance element 14C, the voltage of the first subpixel electrode 11s1 becomes lower. In this manner, the voltage of the first subpixel electrode 11s1 and the voltage of the second subpixel electrode 11s2 can be made different, whereby pixel division driving is established with the first subpixel Sp1 serving as a dark subpixel and the second subpixel Sp2 serving as a bright subpixel. Note that the approach for performing pixel division driving is not limited to what is illustrated herein.

Figure 12A:
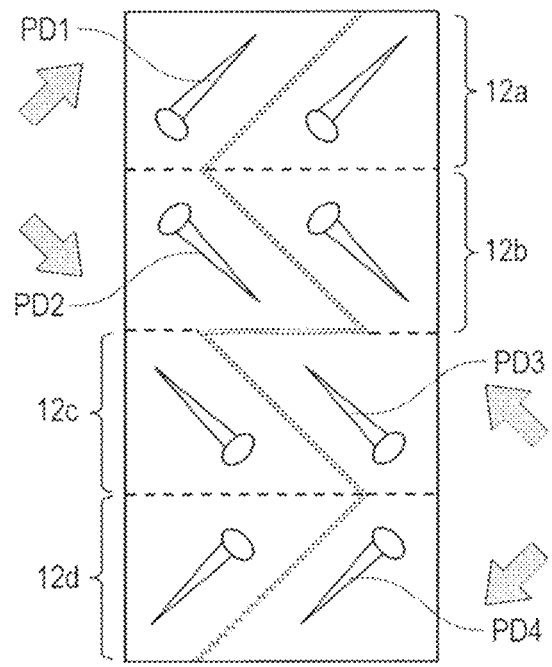
FIG. 12A is a diagram for describing a method for obtaining the alignment division structure of the pixel P, showing pretilt directions PD1, PD2, PD3 and PD4 defined by a first alignment film 12 of an active matrix substrate 10.
Figure 12B:
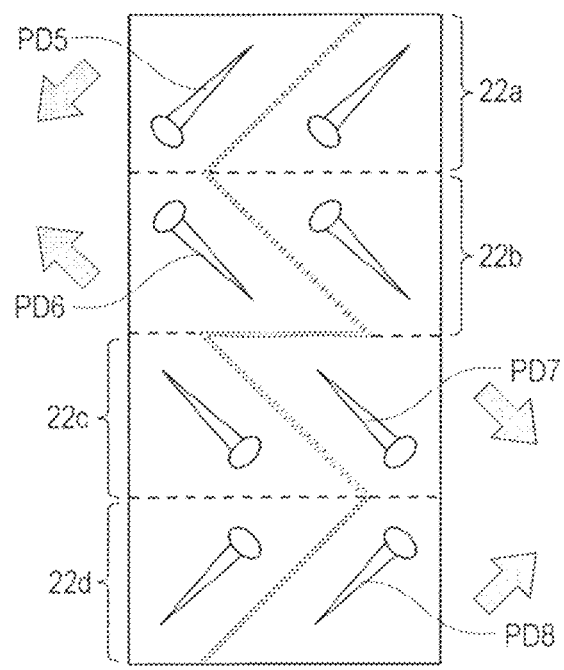
FIG. 12B is a diagram for describing a method for obtaining the alignment division structure of the pixel P, showing pretilt directions PD5, PD6, PD7 and PD8 defined by a second alignment film 22 of a counter substrate 20.
Figure 12C:
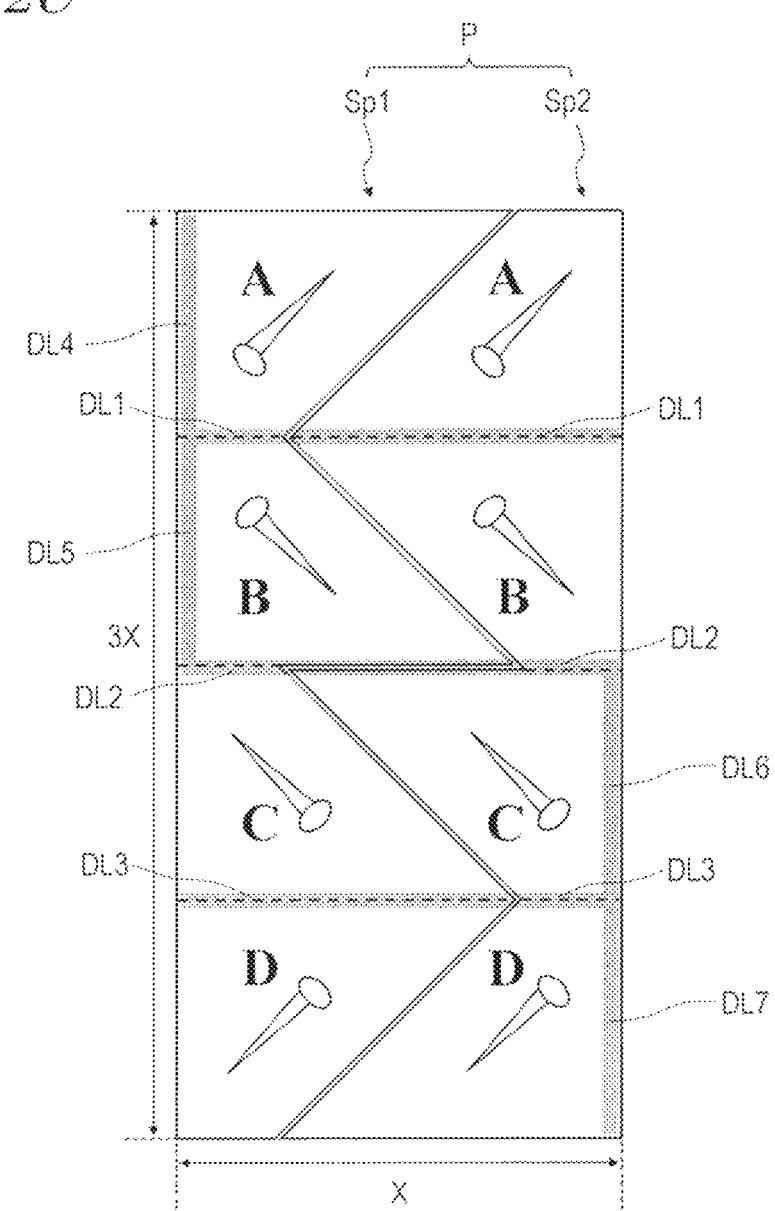
FIG. 12C is a diagram for describing a method for obtaining the alignment division structure of the pixel P, showing, after the active matrix substrate 10 and the counter substrate 20 are attached together, tilt directions (directors) occurring when a voltage is applied across the liquid crystal layer 30.

Next, with reference to FIG. 12A, FIG. 12B, and FIG. 12C, a method of alignment division for obtaining an alignment division structure in the pixel P (i.e., in the first subpixel Sp1 and the second subpixel Sp2) will be described. FIG. 12A shows pretilt directions PD1, PD2, PD3 and PD4 defined by the first alignment film 12 provided on the active matrix substrate 10, whereas FIG. 12B shows pretilt directions PD5, PD6, PD7 and PD8 defined by the second alignment film 22 provided on the counter substrate 20. FIG. 12C shows, after the active matrix substrate 10 and the counter substrate 20 are attached together, tilt directions (directors) occurring when a voltage is applied across the liquid crystal layer 30.

As shown in FIG. 12A, within each pixel P, the first alignment film 12 has a first pretilt region 12a, a second pretilt region 12b, a third pretilt region 12c, and a fourth pretilt region 12d, respectively defining the first pretilt direction PD1, the second pretilt direction PD2, the third pretilt direction PD3, and the fourth pretilt direction PD4, which are different from one another. Specifically, the region of the first alignment film 12 corresponding to one pixel P is divided into four portions along the top-bottom direction, where the respective regions (i.e., the first pretilt region, the second pretilt region, the third pretilt region, and the fourth pretilt region) 12a, 12b, 12c and 12d have been subjected to photo-alignment treatments so as to define respectively different pretilt directions (i.e., the first pretilt direction, the second pretilt direction, the third pretilt direction, and the fourth pretilt direction) PD1, PD2, PD3 and PD4. Herein, the photo-alignment treatments have been performed by obliquely radiating ultraviolet (e.g., linearly-polarized ultraviolet) from respective directions indicated by arrows.

As shown in FIG. 12B, within each pixel P, the second alignment film 22 has a fifth pretilt region 22a, a sixth pretilt region 22b, a seventh pretilt region 22c, and an eighth pretilt region 22d respectively defining the fifth pretilt direction PD5, the sixth pretilt direction PD6, the seventh pretilt direction PD7, and the eighth pretilt direction PD8, which are different from one another. Specifically, the region of the second alignment film 22 corresponding to one pixel P is divided into four portions along the top-bottom direction, where the respective regions (i.e., the fifth pretilt region, the sixth pretilt region, the seventh pretilt region, and the eighth pretilt region) 22a, 22b, 22c and 22d have been subjected to photo-alignment treatments so as to define respectively different pretilt directions (i.e., the fifth pretilt direction, the sixth pretilt direction, the seventh pretilt direction, and the eighth pretilt direction) PD5, PD6, PD7 and PD8. Herein, the photo-alignment treatments have been performed by obliquely radiating ultraviolet (e.g., linearly-polarized ultraviolet) from respective directions indicated by arrows.

By attaching together the active matrix substrate 10 and the counter substrate 20 which have been subjected to photo-alignment treatments as shown in FIG. 12A and FIG. 12B, a pixel P (the first subpixel Sp1 and the second subpixel Sp2) having an alignment division as shown in FIG. 12C can be formed. For each of liquid crystal domains A through D, the pretilt direction defined by the first alignment film 12 on the active matrix substrate 10 and the pretilt direction defined by the second alignment film 22 on the counter substrate 20 are substantially antiparallel, so that, in each of liquid crystal domains A through D, the liquid crystal molecules have a twist angle of substantially 0°.

In the pixel P having the alignment division structure, dark lines DL1 through DL7 occur. Specifically, in the first subpixel Sp1, dark lines DL1, DL2 and DL3 occur at boundaries between adjacent liquid crystal domains, whereas dark lines DL4 and DL5 occur near the edge of the first subpixel electrode 11s1. Moreover, in the second subpixel Sp2, dark lines DL1, DL2 and DL3 occur at boundaries between adjacent liquid crystal domains, whereas dark lines DL6 and DL7 occur near the edge of the second subpixel electrode 11s2.

Now, regarding the pixel P according to the present embodiment and regarding the pixel 1000P' having a single column arrangement as shown on the right side in FIG. 7, the dark lines DL1 through DL3 occurring at boundaries between liquid crystal domains will be considered. As in the discussion of the pixel 1000P', assuming that the pixel P has a lateral length X and a vertical length of 3X, then a total of the lengths of the dark lines DL1, DL2 and DL3 in the pixel 1000P' is about 6X, whereas a total of the lengths of the dark lines DL1, DL2 and DL3 in the pixel P is about 3X. Therefore, assuming that the dark lines DL1 through DL3 in the pixel P and the dark lines DL1 through DL3 in the pixel 1000P' all have an equal width, then the total area of the dark lines DL1 through DL3 occurring at boundaries between liquid crystal domains in the pixel P is smaller than the total area of the dark lines DL1 through DL3 occurring at boundaries between liquid crystal domains in the pixel 1000P'. As a result, the pixel P has an improved transmittance over the pixel 1000P'. Moreover, since a total of the lengths of the dark lines DL1 through DL4 occurring at boundaries between liquid crystal domains in the pixel 900P' as shown on the left side in FIG. 7 is about 5X, the total area of the dark lines DL1 through DL3 occurring at boundaries between liquid crystal domains in the pixel P is smaller than the total area of the dark lines DL1 through DL4 occurring at boundaries between liquid crystal domains in the pixel 900P'. In other words, the pixel P has an improved transmittance over the pixel 900P'.

Now, dark lines occurring near the edge of the pixel electrode (i.e., of the first subpixel electrode and the second subpixel electrode) will also be discussed.

In the pixel 900P', a total of the lengths of the dark lines DL5 through DL8 occurring near the edge of the pixel electrode (two subpixels electrode) is about 5X. In the pixel 1000P', a total of the lengths of the dark lines DL4 through DL7 occurring near the edge of the pixel electrode (two subpixels electrode) is about 3X. On the other hand, in the pixel P according to the present embodiment, a total of the lengths of the dark lines DL4 through DL7 occurring near the edge of the pixel electrode 11 (i.e., of the first subpixel electrode 11Sp1 and the second subpixel electrode Sp2) is about 3X. Thus, in the pixel P according to the present embodiment, the total area of dark lines occurring near the edge of the pixel electrode 11 is smaller than that in the pixel 900P', and is similar to that in the pixel 1000P'.

Next, simulation results of transmittance in a white displaying state will be described, with respect to the pixel P according to the present embodiment, the pixels 900P and 1000P shown in FIG. 7, and the pixels 900P' and 1000P' shown in FIG. 8. In the following description, Examples 1 and 2 are results concerning the pixel P, whereas Comparative Examples 1 and 2 are results concerning the pixels 900P and 1000P, respectively. Comparative Examples 3 and 4 are results concerning the pixel 900P', whereas Comparative Examples 5 and 6 are results concerning the pixel 1000P'. Each of Example 1 and Comparative Examples 1, 2, 3 and 5 is assumed to be a 65" display that is adapted to the 8K definition. Each of Example 2 and Comparative Examples 4 and 6 is assumed to be a 65" display that is adapted to the 4K definition.

Figure 13:
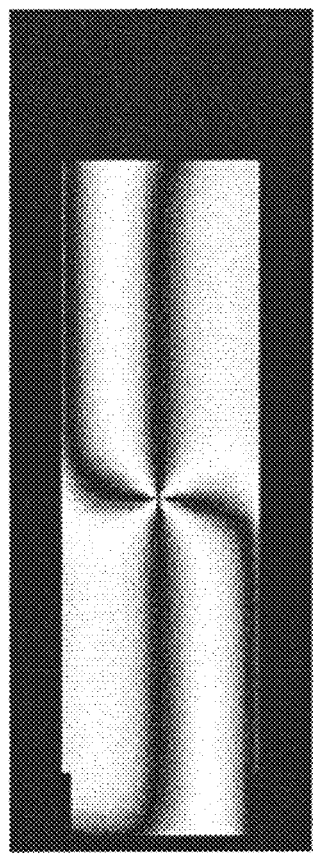
FIG. 13 is a diagram showing a simulation result indicating transmittance distributions within the pixel in a white displaying state, concerning Comparative Examples 1 and 2.
Figure 13:
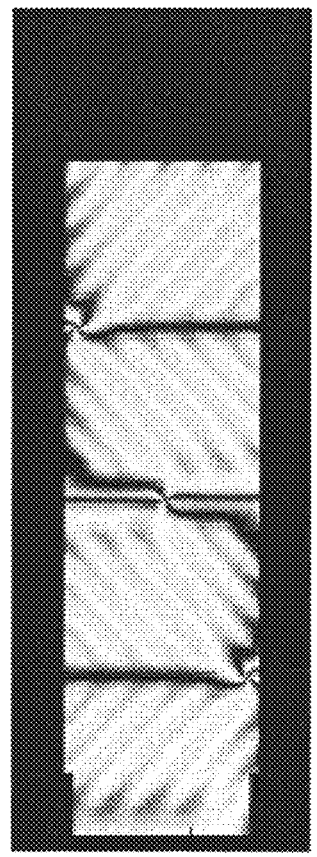
Figure 14:
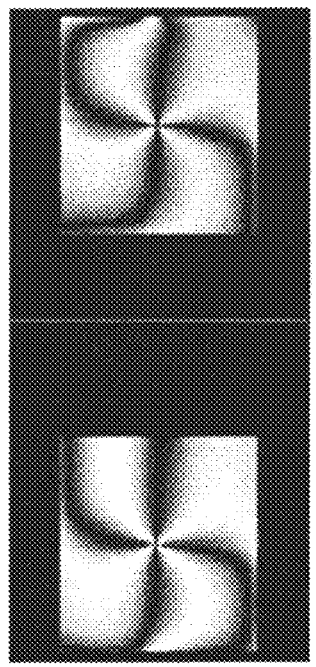
FIG. 14 is a diagram showing a simulation result indicating transmittance distributions within the pixel in a white displaying state, concerning Comparative Examples 3 and 5 and Example 1.
Figure 14:
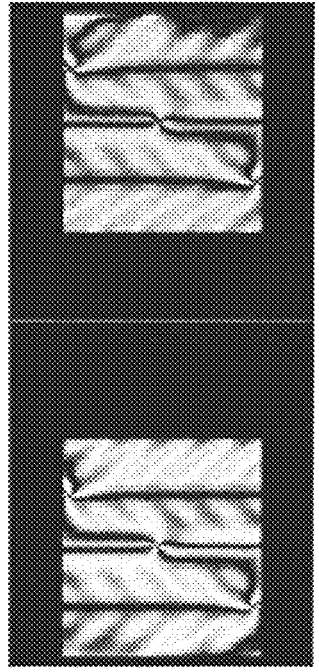
Figure 14:
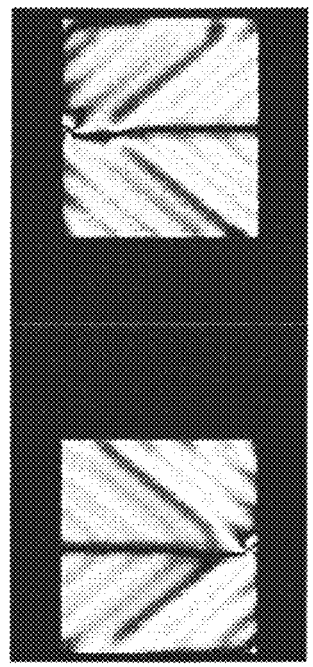
Figure 15:
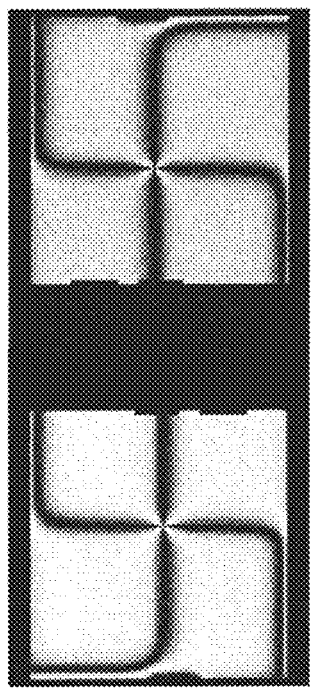
FIG. 15 is a diagram showing a simulation result indicating transmittance distributions within the pixel in a white displaying state, concerning Comparative Examples 4 and 6 and Example 2.
Figure 15:
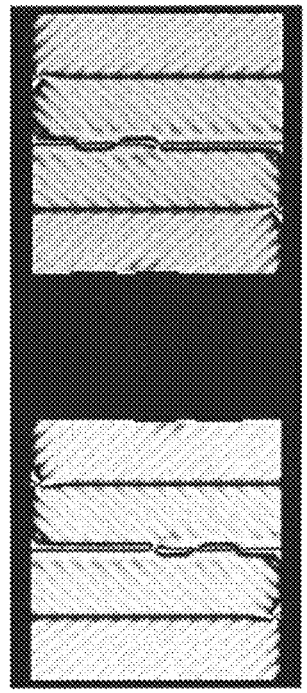
Figure 15:
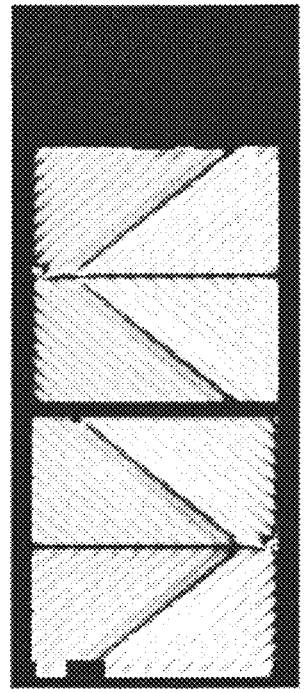

Table 1, Table 2, and Table 3 below show transmittances (arbitrary unit) in Examples 1 and 2 and Comparative Examples 1 to 6 as ascertained through the study. Moreover, FIG. 13, FIG. 14, and FIG. 15 show transmittance distributions in Examples 1 and 2 and Comparative Examples 1 to 6 as ascertained through the study.

TABLE 1

|  | Comparative Example 1 | Comparative Example 2 |
|---|---|---|
| number of domains | 4 | 4 |
| definition | 8K | 8K |
| transmittance | 0.54 | 0.68 (26% improvement) |

TABLE 2

|  | Comparative Example 3 | Comparative Example 5 | Example 1 |
|---|---|---|---|
| number of domains | 8 | 8 | 8 |
| definition | 8K | 8K | 8K |
| transmittance | 0.49 | 0.49 (0% improvement) | 0.61 (23% improvement) |

TABLE 3

|  | Comparative Example 4 | Comparative Example 6 | Example 2 |
|---|---|---|---|
| number of domains | 8 | 8 | 8 |
| definition | 4K | 4K | 4K |
| transmittance | 0.68 | 0.71 (4% improvement) | 0.76 (12% improvement) |

It can be seen from Table 1 and FIG. 13 that, in Comparative Example 2, transmittance is improved over Comparative Example 1 (specifically, a 26% improvement). This is because the single column arrangement of liquid crystal domains reduces the total area of dark lines for the reasons described above.

It can be seen from Table 2 and FIG. 14 that Comparative Examples 3 and 5 are almost identical in transmittance. On the other hand, Example 1 has a higher transmittance than the transmittances of Comparative Examples 3 and 5. Specifically, transmittance in Example 2 is improved by 23% over Comparative Examples 3 and 5.

It can be seen from Table 3 and FIG. 15 that transmittance in Comparative Example 6 is slightly improved over Comparative Example 4 (specifically, a 4% improvement). On the other hand, in Example 2, transmittance is greatly improved over Comparative Examples 4 and 6 (specifically, a 12% improvement over Comparative Example 4).

Thus, while merely adopting a single column arrangement hardly improves transmittance, adopting the configuration of an embodiment of the present invention can greatly improve transmittance. As can be seen from a comparison between Table 2 and Table 3, the effects according to the embodiment(s) of the present invention become more outstanding as the pixel size decreases (i.e., as the definition increases).

Other Embodiments

The arrangement of liquid crystal domains in each of the first subpixel Sp1 and the second subpixel Sp2 is not limited to the examples shown in FIG. 10. In the examples shown in FIG. 10, along the pixel longitudinal direction D1, the liquid crystal domains A (whose reference alignment direction is substantially the 225° direction), B (whose reference alignment direction is substantially the 135° direction), C (whose reference alignment direction is substantially the 315° direction), and D (whose reference alignment direction is substantially the 45° direction) are arranged in this order.

Figure 16:
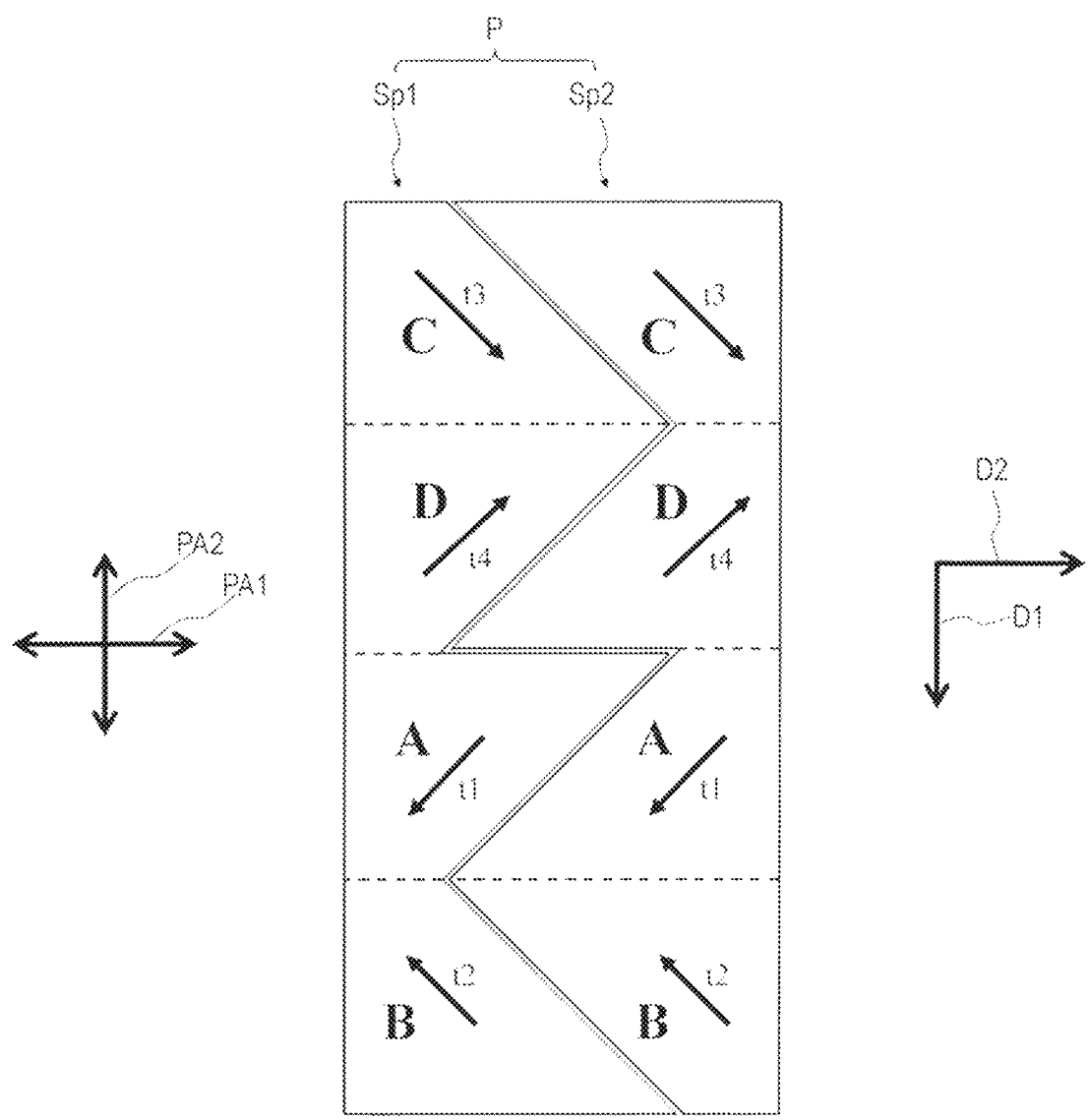
FIG. 16 is a diagram showing another example of the alignment division structure of the pixel P in the liquid crystal display apparatus 100.

Instead, an arrangement shown in FIG. 16 may be adopted. In the example shown in FIG. 16, in each of the first subpixel Sp1 and the second subpixel Sp2, the liquid crystal domains C, D, A and B are arranged in this order from above to below (i.e., along the pixel longitudinal direction D1). With the arrangement illustrated in the example of FIG. 16, similar effects to those attained by the arrangements of FIG. 10 can be obtained.

In the example shown in FIG. 10, the boundary between the first subpixel Sp1 and the second subpixel Sp2 includes not only the first portion bd1, the second portion bd2, the third portion bd3, and the fourth portion bd4, but also the fifth portion bd5 that is substantially parallel to none of the first slits 11a1, the second slits 11a2, the third slits 11a3, and the fourth slit 11a4. This fifth portion bd5 may be omitted. However, when the boundary between the first subpixel Sp1 and the second subpixel Sp2 consists only of the first portion bd1, the second portion bd2, the third portion bd3, and the fourth portion bd4, it may be difficult to ensure that the four liquid crystal domains within each subpixel have a substantially equal area with one another. Therefore, from the standpoint of viewing angle characteristics, it may be preferable for the boundary between the first subpixel Sp1 and the second subpixel Sp2 to include a portion that is substantially parallel to none of the first slits 11a1, the second slits 11a2, the third slits 11a3, and the fourth slit 11a4.

Liquid crystal display apparatuses according to embodiments of the present invention are suitably used in applications for which high quality displaying is required, e.g., television sets. Embodiments of the present invention are suitably used in high-resolution liquid crystal display apparatuses, e.g., those of the 4K definition or above).

The present application claims the benefit of U.S. Provisional Application No. 62/853,982 filed on May 29, 2019, the disclosure of which is hereby incorporated by reference in its entirety.

What is claimed is:
1. A liquid crystal display apparatus comprising:
a first substrate and a second substrate opposing each other; and
a liquid crystal layer of vertical alignment type provided between the first substrate and the second substrate,
the liquid crystal display apparatus having a plurality of pixels, wherein,
the first substrate includes a pixel electrode provided for each of the plurality of pixels, and a first alignment film provided between the pixel electrodes and the liquid crystal layer;
the second substrate includes a counter electrode opposing the pixel electrodes, and a second alignment film provided between the counter electrode and the liquid crystal layer;
each of the plurality of pixels includes a first subpixel and a second subpixel which allow respectively different voltages to be applied across the liquid crystal layer;
the pixel electrode of each pixel includes a first subpixel electrode provided for the first subpixel and a second subpixel electrode provided for the second subpixel;

each of the first subpixel and the second subpixel includes a first liquid crystal domain, a second liquid crystal domain, a third liquid crystal domain, and a fourth liquid crystal domain, each liquid crystal domain having a reference alignment direction defined by the first alignment film and the second alignment film, and the first to fourth liquid crystal domains having respectively different reference alignment directions;

a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction;

the first direction, the second direction, the third direction, and the fourth direction each make an angle which is substantially equal to an odd multiple of 45° with respect to the pixel transverse direction of each pixel;

in each pixel, each of the first subpixel electrode and the second subpixel electrode includes: a first slit which is formed in a region corresponding to the first liquid crystal domain and which extends substantially in parallel to the first direction; a second slit which is formed in a region corresponding to the second liquid crystal domain and which extends substantially in parallel to the second direction; a third slit which is formed in a region corresponding to the third liquid crystal domain and which extends substantially in parallel to the third direction; and a fourth slit which is formed in a region corresponding to the fourth liquid crystal domain and which extends substantially in parallel to the fourth direction;

in each of the first subpixel and the second subpixel, the first liquid crystal domain, the second liquid crystal domain, the third liquid crystal domain, and the fourth liquid crystal domain are arranged in this order along the pixel longitudinal direction of the pixel;

the first subpixel and the second subpixel adjoin each other along the pixel transverse direction; and a boundary between the first subpixel and the second subpixel includes a portion which is substantially parallel to the first slit, a portion which is substantially parallel to the second slit, a portion which is substantially parallel to the third slit, and a portion which is substantially parallel to the fourth slit.

2. The liquid crystal display apparatus of claim 1, wherein, when an azimuth angle of the pixel transverse direction of each pixel is defined as 0°, the first direction, the second direction, the third direction, and the fourth direction are, respectively, substantially the 225° direction, substantially the 135° direction, substantially the 315° direction, and substantially the 45° direction.

3. The liquid crystal display apparatus of claim 1, wherein, when an azimuth angle of the pixel transverse direction of each pixel is defined as 0°, the first direction, the second direction, the third direction, and the fourth direction are, respectively, substantially the 315° direction, substantially the 45° direction, substantially the 225° direction, and substantially the 135° direction.

4. The liquid crystal display apparatus of claim 1, wherein each of the first alignment film and the second alignment film is a photo-alignment film.

5. The liquid crystal display apparatus of claim 1, wherein, in each of the first liquid crystal domain, the second liquid crystal domain, the third liquid crystal domain, and the fourth liquid crystal domain of each pixel, a pretilt direction that is defined by the first alignment film and a pretilt direction that is defined by the second alignment film are substantially antiparallel.

* * * * *